(12) United States Patent
Hamann et al.

(10) Patent No.: US 9,652,002 B2
(45) Date of Patent: May 16, 2017

(54) MODULAR TABLET CASE

(71) Applicant: MOBELISK LLC, Phoenix, AZ (US)

(72) Inventors: Dennis Hamann, Phoenix, AZ (US);
Fred Shapiro, Phoenix, AZ (US);
David Aitchison, Phoenix, AZ (US);
Joseph Pepe Elijio Velasquez,
Fountain Hills, AZ (US); Michael Aitchison, Oldsmar, FL (US); Camron Harold Vossberg, Tempe, AZ (US)

(73) Assignee: MOBELISK GROUP, LLC, Phoenix, AZ (US)

( * ) Notice: Subject to any disclaimer, the term of this patent is extended or adjusted under 35 U.S.C. 154(b) by 362 days.

(21) Appl. No.: 14/280,451

(22) Filed: May 16, 2014

(65) Prior Publication Data
US 2014/0347000 A1 Nov. 27, 2014

Related U.S. Application Data

(60) Provisional application No. 61/824,336, filed on May 16, 2013.

(51) Int. Cl.
*H02J 7/00* (2006.01)
*G06F 1/18* (2006.01)
*G06F 1/16* (2006.01)

(52) U.S. Cl.
CPC ............ *G06F 1/189* (2013.01); *G06F 1/1626* (2013.01); *G06F 1/181* (2013.01); *H02J 7/0044* (2013.01);
(Continued)

(58) Field of Classification Search
CPC ..................................................... H02J 7/0044
(Continued)

(56) References Cited

U.S. PATENT DOCUMENTS

| 5,606,594 A | * | 2/1997 | Register | .................. H04B 1/38 |
| | | | | 379/428.04 |
| 5,926,006 A | | 7/1999 | Burroughs et al. | |

(Continued)

OTHER PUBLICATIONS

International Search Report and Written Opinion mailed on Sep. 30, 2014 in International Application PCT/US2014/038489.
(Continued)

*Primary Examiner* — Edward Tso
*Assistant Examiner* — Ahmed Omar
(74) *Attorney, Agent, or Firm* — Pillsbury Winthrop Shaw Pittman LLP

(57) ABSTRACT

A tablet computer with modular assembly having interchangeable end cap portions, and a method for installing the same. The assembly provides a universal design and customized features to a range of tablets. The modular assembly has a tablet carrier encasing a selected type of tablet computer and an exterior housing enclosing the tablet carrier. The exterior housing contains at least one battery and a controller for communication with the selected tablet computer. The housing also includes end cap portions configured to communicate with the controller and implement a function. The end caps can be interchanged. The tablet carrier and/or exterior housing can also include one or more programmable buttons with actuators for electromechanically actuating a button or an application associated with the tablet.

42 Claims, 25 Drawing Sheets

(52) U.S. Cl.
CPC ....... *H02J 7/0054* (2013.01); *Y10T 29/49002* (2015.01)

(58) Field of Classification Search
USPC .................................................. 320/107, 114
See application file for complete search history.

(56) References Cited

U.S. PATENT DOCUMENTS

| | | |
|---|---|---|
| 6,646,866 B2 | 11/2003 | Kao |
| 6,981,085 B2 | 12/2005 | Tree |
| 7,088,578 B1 | 8/2006 | Gruby |
| 7,609,512 B2 | 10/2009 | Richardson |
| 7,612,997 B1 | 11/2009 | Diebel et al. |
| 7,688,580 B2 | 3/2010 | Richardson |
| 7,782,610 B2 | 8/2010 | Diebel |
| 7,907,394 B2 | 3/2011 | Richardson |
| 8,289,698 B1 | 10/2012 | Walder |
| 8,367,235 B2 | 2/2013 | Huang |
| 2008/0259551 A1* | 10/2008 | Gavenda ............... G06F 1/16 361/679.31 |
| 2011/0287808 A1* | 11/2011 | Huang ............... H04B 1/3883 455/557 |
| 2012/0074005 A1 | 3/2012 | Johnson |

OTHER PUBLICATIONS

International Preliminary Report on Patentability issued Nov. 17, 2015 in International Application PCT/US2014/038489.
International Preliminary Report on Patentability dated Nov. 26, 2015 for Appln. No. PCT/US2014/038489.

* cited by examiner

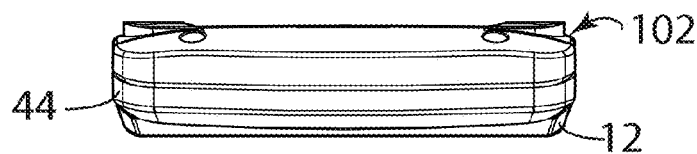
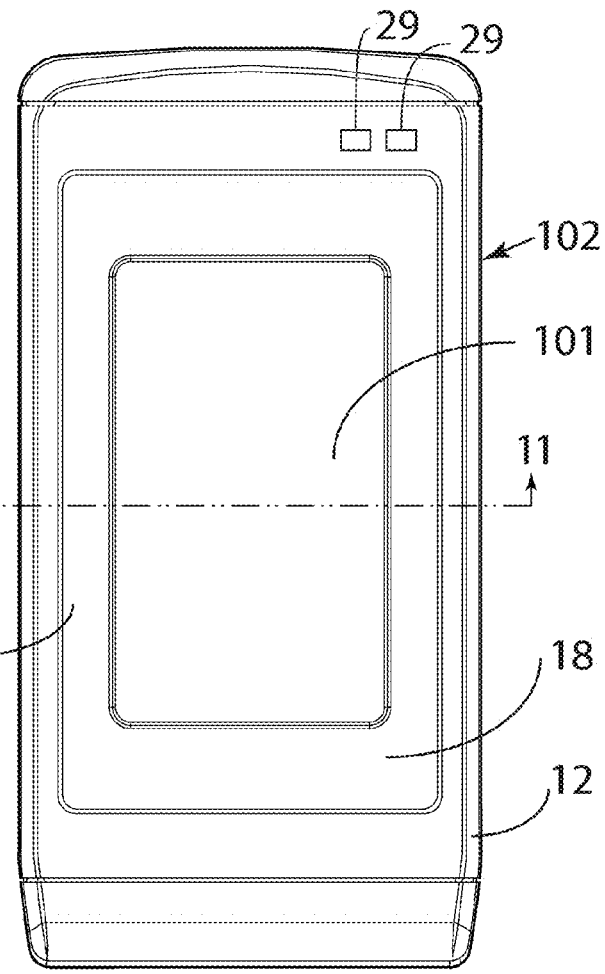
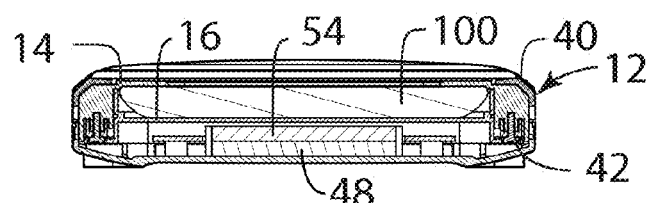
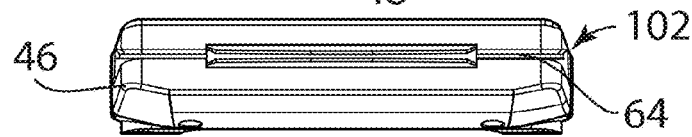

 Specification

| | MV7L, 7" LTE tablet |
|---|---|
| Target Dimension | 198mm x 123mm x 9.6mm |
| Estimated Weight | Estimated 370g |
| CPU | Media Tek,MT8389E, 1.2G~1.4G Quad core |
| System Memory | DDR3 1G |
| LCD | 7"W TFT, IPS, 1280 x 800 |
| Touch screen | Projected capacitive type |
| Touch controller | 5 points touch |
| Storage | eMMC 8G |
| G Sensors | YES |
| Ambient Light Sensor | YES |
| Gyro | YES |
| Digital compass | YES |
| I/O | 3.5mm Headphone-out & Mic-in combo jack x 1 |
| | Micro USB x 1 (support PC connection and DC-in charge) |
| | Micro SD card (up to 32GB) |
| | Micro-SIM card for LTE |
| | Micro HDMI |
| | DC Jack |
| Switch | One Power switch for Power on off / Suspend / Resume ; 2 Volume key for Volume + |
| LED Indicator | One LED for charging status |
| WLAN/Bluetooth | 802.11b/g/n + Bluetooth + FM |
| GPS | YES |
| LTE | LT70, Band 13 |
| Antenna | wifi/BT, GPS ,LTE x 2 |
| Front Camera | 1.2MP F/F |
| Rear Camera | 5MP A/F |
| Camera Flash | YES |
| Speakers | Stereo speakers x 2 with front vent |
| Microphone | Internal MIC x 1, digital type |
| Adapter | Input: 100~240V |
| | Output: USB 5V, Current rating:1.8A |
| Operating System | Jelly Bean |
| Main Battery | 4000mAh |

FIG. 17

BLANK SLATE TABLET ENGINE SPECIFICATIONS

| | Table Features for Blank Slate Engine |
|---|---|
| 1 | Android 4.x, at/or upgradable to Jelly Bean or 4.2 O/S |
| 2 | 1GHz, Dual-Core Processor, Minimum |
| 3 | 1GB LPDDR on Board |
| 4 | Storage via microSD card slot (Default: 8GB) |
| 5 | 7" Color Display, 1280 x 800, LED BL, IPS or equivalent |
| 6 | Capacitive touch screen |
| 7 | two finger input, simple pen input |
| 8 | matte finish, fingerprint resistant |
| 9 | Speakers, two internal, 1W / CH |
| 10 | Microphone, front facing, omnidirectional |
| 11 | Headset jack, stereo out, mono input, 3.5mm |
| 12 | USB 2.0 port, device mode only |
| 13 | USB 2.0 port, dedicated host mode |
| 14 | Wireless PAN, Bluetooth 3.0 |
| 15 | Wireless LAN, 802.11b/g/n, 2.4GHz ISM Band |
| 16 | Wireless WAN, 4G LTE CDMA-based data only |
| 17 | Assisted GPS (aGPS) |
| 18 | Rear facing camera |
| | 8MP, dual-mode with autofocus & flash |
| 19 | Front facing camera |
| | 1.3MP, optimized for low-ambient light environments |
| 20 | Accelerometer |
| 21 | Gyroscope |
| 22 | Ambient light sensor |
| 23 | Compass |
| 24 | Vibrator |
| 25 | Power Button |
| 26 | Volume Control Buttons |
| 27 | Power / Charge Indicator LED |
| 28 | 8+ Hours of Battery Life |

FIG. 18

| Case Features (tablet within case) | |
|---|---|
| 1 | Handstrap |
| | Adjustable rear- side hand strap |
| 2 | Second Battery |
| | Embedded in case, no smaller in capacity than tablet |
| 3 | Pen Garage |
| | Opening that securely holds a pen with both the |
| | pen and case supporting a tether |
| 4 | Audio |
| | Case ports audio output from tablet and allows |
| | input into embedded microphone |
| 5 | Ports |
| | 1xMicro -USB device port for charge / data synch |
| | 1xMini - USB host port |
| | Sliding door type covers |
| | USB port placement to not interfere with MSR |
| 6 | Controls |
| | Power Button |
| | Volume Up / Down Buttons |
| 7 | Indicators |
| | Power / Charge LED |
| 8 | Durability |
| | Ingress Protection Level 54 Compliance |
| | Compliance with MIL -STD - 810G Specification, |
| | Procedure 516.6, Method II, Operating Drop, 1.5M |
| 9 | Magnetic Strip Reader |
| | Bi-directional swiping supported |
| | Data is encrypted before leaving the read heads |
| | Easy for replacement / rework OR support for RKI |
| | Water resistant slot cover |
| 10 | NFC with EMV |
| | (13.56MHz, ISO/IEC 18092,14443A/B & FeliCa Std.) |
| | Supporting NFC Forum Type 1~3 Tag Operation and |
| | Type 4 Tag Operation based on Spec 2.0 |
| | LED indicator of read complete |
| 11 | Secure Keypad (Factory / Service Option) |
| | Required for ATM PIN input, encrypted |
| | Enabling debit transactions |
| 12 | Chip & Pin Interface (Factory / Service Option) |
| | Secure keypad for PIN input, encrypted |
| | Close range NFC for secure reading of Chip |
| 13 | Fingerprint Reader (Factory Option) |
| | Area fingerprint reader |
| | SW development to enable credential based access |
| 14 | Mounting Bracket (Option) |
| | Securing to rear mounted bracket to secure device |
| | to stationary stand & ensures good power connection |
| | allows for fixed or removable configurations |

FIG. 19

MODULAR TABLET CASE

CROSS REFERENCE TO RELATED APPLICATION(S)

This patent application claims priority to provisional patent application 61/824,336 filed on May 16, 2013, and is incorporated by reference herein in its entirety.

BACKGROUND

Field

The present disclosure is generally related to a modular assembly or case for an electronic device, such as a tablet.

Description of Related Art

Covers for electronic devices such as cell phones and tablets are known. For those electronic devices with a touch screen, covers typically include an opening providing access to the screen. Some covers also have parts (e.g., holes or press buttons) that correspond and align with a position of the devices (e.g., ports or buttons) on the tablet to allow mechanical access to the tablet devices. Some manufacturers may also limit themselves entirely to plastic enclosures for purely esthetic and rudimentary protective purposes.

SUMMARY

It is an aspect of this disclosure to provide a modular case assembly for a selected range of tablet computers. The modular assembly includes: a tablet carrier encasing a selected tablet computer selected from the range of tablet computers. The selected tablet computer has a length, a width, one or more ports, and an external button configuration. Also, an exterior housing encloses the tablet carrier and has at least one battery and a controller for communication with the selected tablet computer. An end cap is attached to the exterior housing and includes a functional device in communication with the controller by a connector. The tablet carrier has internal surfaces for retaining the selected tablet computer while still providing access to the one or more ports and the external button configuration of the selected tablet computer. The at least one battery and the controller contained by the exterior housing are operatively connected to one or more ports of the tablet computer so as to allow communication of power and data between the controller, the tablet computer, and the functional device of the end cap.

Another aspect provides a method for installing a plurality of modular assemblies to a plurality of tablet computers having varying lengths and/or widths and one or more ports and button configurations. The method includes: providing a plurality of first tablet carriers that are each configured to encase a first type of tablet computer when the carriers are installed on their corresponding tablet computers; providing a plurality of second tablet carriers that are each configured to encase a second type of tablet computer when the carriers are installed on their corresponding tablet computers, the second type of tablet computer being different than the first type of tablet computer; wherein the plurality of the first and the second tablet carriers each have internal surfaces for retaining the respective first and second types of tablet computers while still providing access to the one or more ports and buttons of the first and second types of tablet computers when the first and second tablet carriers are installed therearound; providing a plurality of common exterior housings that are each configured to enclose the first and second tablet carriers once the first and second tablet carriers are installed on their corresponding tablet computers, each exterior housing having at least one battery and a controller for communication with its corresponding tablet computer; providing a plurality of end caps configured for attachment to the plurality of common exterior housings and including a functional device for communication with the controller by a connector; and, wherein the method further includes: installing the first tablet carriers on the first type of tablet computers, installing the second tablet carriers on the second type of tablet computers, and installing the common exterior housings to enclose the first and second tablet carriers therein with the respective first and second types of tablet computers installed; installing the end caps on the common exterior housings and establishing communication between the controllers and the functional devices; wherein the installing of each of the common exterior housings includes operatively connecting the at least one battery and the controller to one or more ports of each of the corresponding tablet computers so as to allow communication of power and data between the controllers, the corresponding tablet computers, and the functional devices of the end caps.

Yet another aspect provides an encased tablet computer system including: a tablet computer, a tablet carrier, and an exterior housing. The tablet computer has a length, a width, one or more ports, and an external button configuration. The tablet carrier encases the tablet computer. The exterior housing encloses the tablet carrier and at least one battery and a controller for communication with the tablet computer. An end cap is attached to the exterior housing and includes a functional device in communication with the controller by a connector. The tablet carrier has internal surfaces for retaining the tablet computer while still providing access to the one or more ports and the external button configuration of the tablet computer. The at least one battery and the controller contained by the exterior housing are operatively connected to one or more ports of the tablet computer so as to allow communication of power and data between the controller, the tablet computer, and the functional device of the end cap.

Still yet another aspect provides a method for automatically monitoring and charging a tablet computer enclosed within a modular case assembly. The modular assembly comprises: a tablet carrier encasing the tablet computer, the tablet computer having a length, a width, one or more ports, a tablet battery, an external button configuration, and an exterior housing enclosing the tablet carrier. The exterior housing comprises at least one case battery and a controller for communication with the tablet computer, and at least one end cap attached to the exterior housing and including a functional device in communication with the controller by a connector. The tablet carrier has internal surfaces for retaining the tablet computer while still providing access to the one or more ports and the external button configuration of the tablet computer. The at least one case battery and the controller are contained by the exterior housing and operatively connected to one or more ports of the tablet computer so as to allow communication of power and data between the controller, the tablet computer, and the functional device of the at least one end cap. The method includes: automatically monitoring a state of charge of the at least one case battery; automatically monitoring a state of charge of the tablet battery; and automatically charging the tablet battery using the at least one case battery.

Other features and advantages of the present disclosure will become apparent from the following detailed description, the accompanying drawings, and the appended claims.

BRIEF DESCRIPTION OF THE DRAWINGS

FIG. 9 is a first end view of the electronic device with the installed modular assembly.

FIG. 10 is a top view of the electronic device with the installed modular assembly in a vertical position.

FIG. 11 is a cross sectional view along line 11-11 of FIG. 10.

FIG. 12 is a second end view of the electronic device with the installed modular assembly.

FIG. 17 is an exemplary specification associated with an electronic device that can be enclosed by a modular assembly as disclosed herein.

FIGS. 18 and 19 are another example of specifications associated with the electronic device and modular assembly.

DETAILED DESCRIPTION OF THE PREFERRED EMBODIMENT(S)

Figure 1:
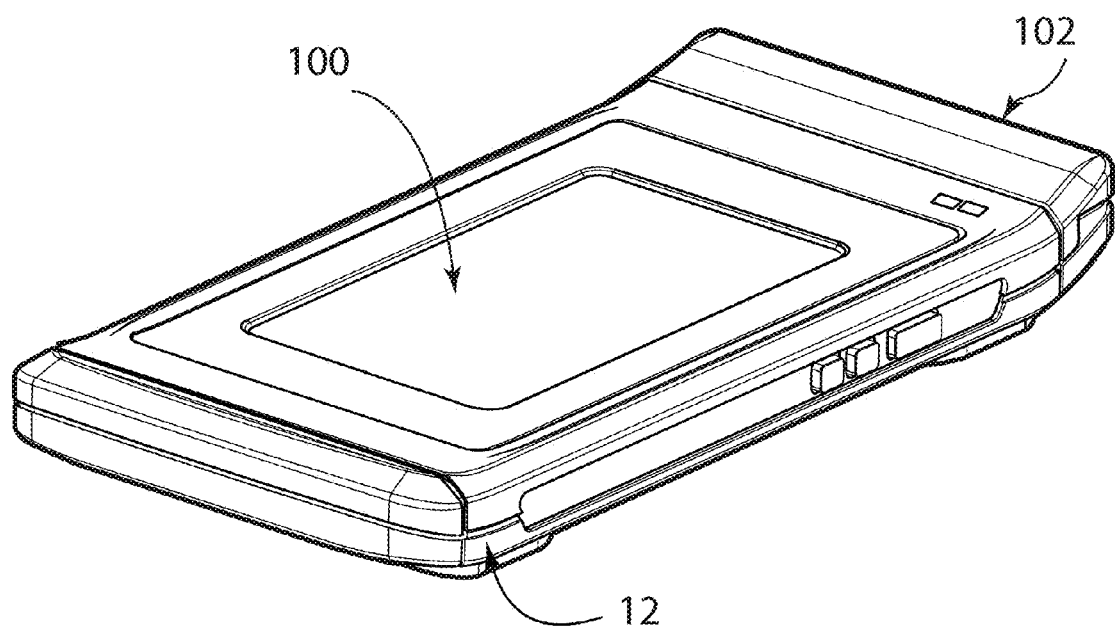
FIG. 1 is a perspective view of an electronic device with an installed modular assembly in accordance with an embodiment of this disclosure.

Disclosed herein is a modular assembly that is a universal case for different types of tablet computers and that brings modular functionality to those different tablets. As further described in detail below, the case includes interchangeable end caps that provide a function for implementation on or with the tablet computer. Each modular assembly can also include at least one programmable button that uses electro-mechanical actuation to actuate a button or function associated with the tablet computer. This disclosure also provides a method for installing modular assemblies around tablet computers, despite the tablet computer design and configuration.

Referring now more particularly to the drawings, FIGS. 1-12 show an electronic device 100 with a modular case assembly 102, or "smartcase," or "modular assembly" (which terms may be used interchangeably throughout this disclosure) having interchangeable end cap portions. The electronic device 100 shown is a tablet computer. The tablet computer 100 can be any type of tablet computer and is not limited by brand, design, size, or operating system. This includes, but is not limited to, phablets, i.e., mobile devices designed to combine smartphone and tablet functions. As understood by one of ordinary skill in the art, the tablet computer has a core CPU providing tablet hardware set, core operating system, and the ability to add/customize software applications tailed to specific use cases. Tablet computers lack integrated physical keyboards and use the touchscreen interface for user interaction, which may include a virtual keyboard displayed on the touchscreen. This differentiates tablet computers from laptops or other electronic devices where a physical keyboard is attached or needed for user typing. Touch screen sizes may be approximately five inches (e.g., 5.1") to approximately twelve inches (e.g., 12.1"), for example. In some cases, the screens are smaller (approximately four to seven inches) or larger.

For example, the tablet computer can be a media tablet such as those available on the market (e.g., Google Nexus 7, Apple iPad, Apple iPad Mini, Amazon Kindle, Samsung Galaxy Tab (2, 3, 4, Pro, 7, 8, 8.4, or 10.1) or Galaxy Note (8.0)) or later manufactured for sale, or a custom designed tablet engine computer. Communication capabilities (e.g., Bluetooth, GPS, LTE, WiFi functionality) can be provided in the tablet computer. Further, the operating system (OS) associated with the tablet computer can be any number of operating systems, including, but not limited to: Android-based, iOS, and Windows Mobile, and the software associated with the tablet computer is unlimited. The tablet computer has a touch screen 101 (e.g., projected capacitive type touch screen with 5 points touch controller) and can include any number of sensors associated therewith. Further, the tablet computer has a power source or a battery therein, a power switch for on/off and suspend/resume functions, as well as one or two volume keys, for example. Other devices, such as LEDs, camera(s), flash, etc., can also be provided in the tablet computer.

FIG. 17 illustrates a chart with exemplary specifications for a tablet computer manufactured by Qwanta, for example, that can be used as the electronic device 100 with the disclosed modular assembly 102. FIG. 18 provides another chart with features of a tablet computer that can be used with the modular assembly 102. Such features may include, but are not limited to: a current and/or upgradable operating system (OS), dual core processor, on board LPDDR, optional microSD card slot, capacitive touch screen, finger and/or pen input, speakers, microphone, headset jack, optional USB ports, wireless connections, geo-tracking or GPS capabilities, camera (rear or front facing), accelerometer, gyroscope, ambient light sensor, compass, vibrator, power and volume control buttons, and LEDs.

Accordingly, the term "tablet computer" is used throughout this disclosure to describe electronic devices such as tablets or phablets or pads (with touch screens), or other such electronic devices, without limiting a type, brand, and/or features of such devices.

As generally understood, tablet computers can have varying lengths and/or widths, varying camera locations (if at all), and one or more ports (e.g., input and/or output) and external button configurations. The modular assembly 102 as described herein is configured for installation and use with any of such devices.

FIG. 1 shows an installed modular assembly 102 around the tablet computer 100. The modular assembly 102 includes a tablet carrier 10 encasing a selected tablet computer/electronic device 100 and an exterior housing 12 enclosing the tablet carrier 10.

The tablet carrier 10, sometimes also referred to herein as an interposer, interconnects with the selected tablet computer 100 being utilized. The tablet carrier 10 has a top portion 14 and a bottom portion 16 that are connected and secured together. The top portion 14 and the bottom portion 16 of each tablet carrier 10 are each formed to have a length and a width suitable to support any number of tablet computers. Generally, the tablet carrier 10 acts as a support for a range or a variety of consumer tablet computers ranging in size from about five inches to about ten inches, although it is not limited to such examples. In an embodiment, the tablet carrier 10 is formed to support a pre-selected tablet computer. For example, each tablet carrier can act as an internal sleeve for containing a selected type of tablet (e.g., a particular brand of a particular size or dimension with a particular operating system and CPU). In an embodiment, the tablet carrier 10 provides access to the one or more ports and the external button configuration of the selected tablet computer.

As will be discussed in more detail below, the tablet carrier 10 has an internal configuration that can vary between different carriers 10 to fit/interface properly with different tablet computers, but their external configuration is constant so as to fit/interface with other parts of the assembly external to it (e.g., exterior housing 12). Thus, different internal carriers 10 can be used with common external parts to make the overall assembly modular.

Top portion 14 of the tablet carrier/interposer 10 includes a peripheral top wall 17 defining a window having top surface 18 and a bottom surface 20 and an opening 22 for providing access to the touch screen 101 of the tablet computer 100. The top portion 14 may also include an aperture (not shown) for a front-facing camera of the tablet computer 100 so as to allow for functional operation of a front-facing camera. The bottom surface 20 is aligned with and placed over the top of the tablet computer 100 and adjacent to its touch screen 101. Top portion 14 can also include one or more side walls 24 extending (downwardly) from the peripheral top wall 17 that are sized to surround a portion of the tablet computer 100.

Bottom portion 16 of the carrier/interposer 10 includes a bottom wall 27 having a top surface 26 and a bottom surface 28. The top surface 26 is placed adjacent to a bottom part of the tablet computer 100. Bottom portion 16 can include one or more side walls 30 extending (upwardly) from the bottom surface 27 that are sized to surround a portion of the tablet computer 100 (e.g., see FIG. 2). The bottom portion 16 may also include an aperture (not shown) for a rear-facing camera of the tablet computer 100, so as to allow for functional operation of a rear-facing camera, and/or other opening(s) for access to a part of the tablet computer 100). The tablet computer 100 can be received in the bottom portion 16.

As can be seen, the internal surfaces defined by the top and bottom portions 14 and 16 facing the tablet computer 100 fit it closely to prevent shifting of the tablet computer 100 within the carrier/interposer 10. This fit may be established by continuous contact about the tablet computer periphery, or by point contact using projections that extend inwardly to contact the tablet computer 100.

Figure 4:
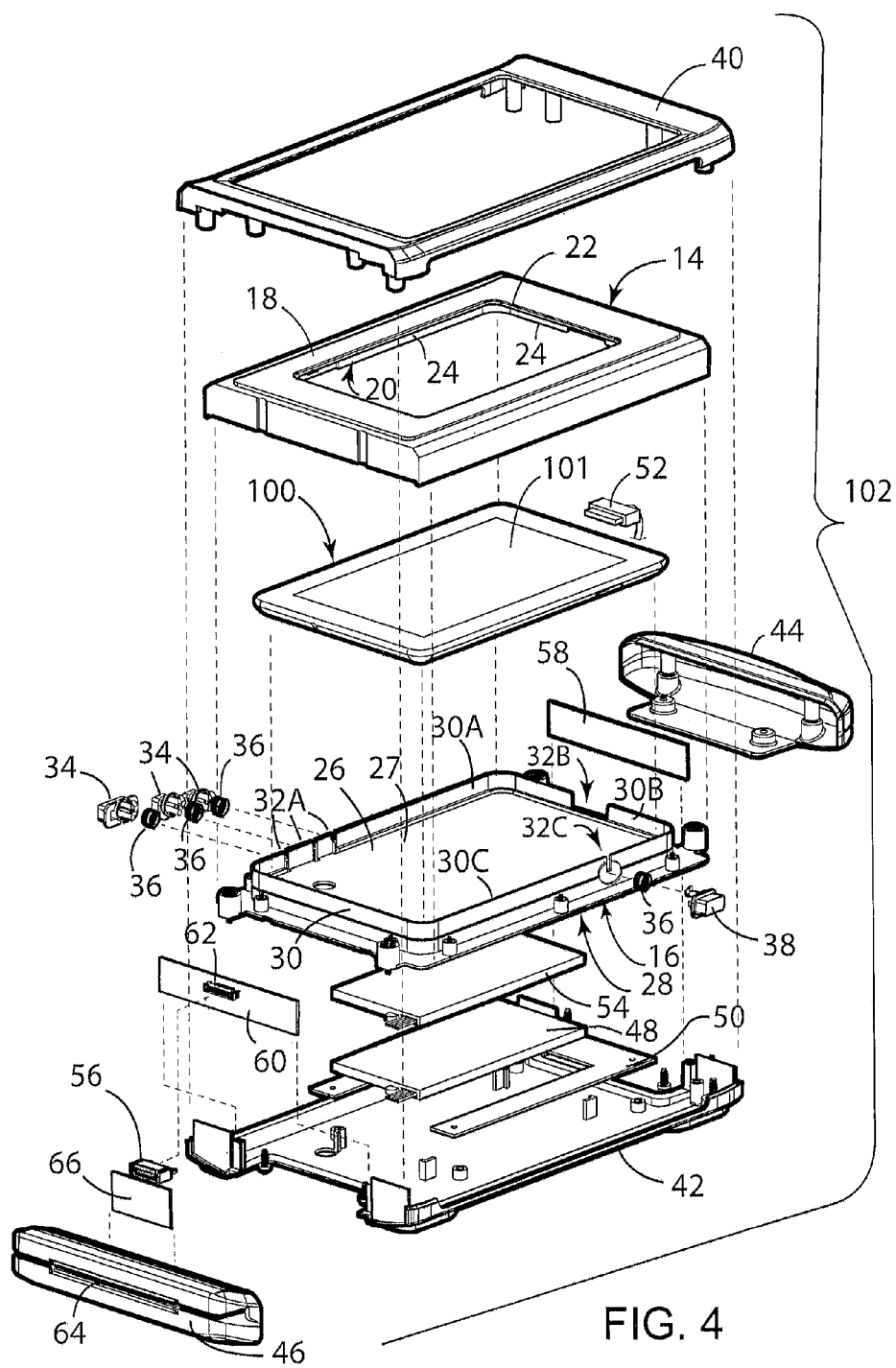
FIG. 4 is an exploded view of the modular assembly of FIG. 1.

As shown in FIG. 4, in an embodiment, bottom portion 16 of tablet carrier 10 may include cut-outs or openings 32 that can provide access to the one or more ports and buttons of a tablet computer 100 when the tablet computer 100 is received in and encased by the bottom portion 16. These access areas or openings 32 may be provided in one or more side walls 30, for example. In the illustrated embodiment of FIG. 4, there are three openings 32A provided on a side wall 30A and a cut-out opening 32B on a bottom side wall 30B. An additional opening 32C is provided on another side wall 30C.

Alternatively, in another embodiment, top portion 14 of tablet carrier 10 includes such cut-outs or openings 32, which can provide access to ports and buttons of the tablet computer 100.

In an embodiment, the openings 32A provided on side wall 30A are configured for alignment with buttons existing on a selected tablet computer 100. For example, the openings 32A may be respectively associated with a power button and one or more volume buttons provided on the tablet computer 100. In an embodiment, carrier buttons 34 with optional springs 36 can be attached to the bottom portion 16 of the tablet carrier 10 and aligned with the openings 32A to directly or physically actuate the existing power and volume buttons on the tablet computer 100 when forced is applied thereto. Cut-out opening 32B on bottom side wall 30B may align with a slot 103 or a data communication port on the tablet computer 100 such that a tablet connector or USB cable may be inserted into the slot 103 or data communication port. Alternatively, a wireless connector may be used, and such openings or slots may not be required.

Figure 2:
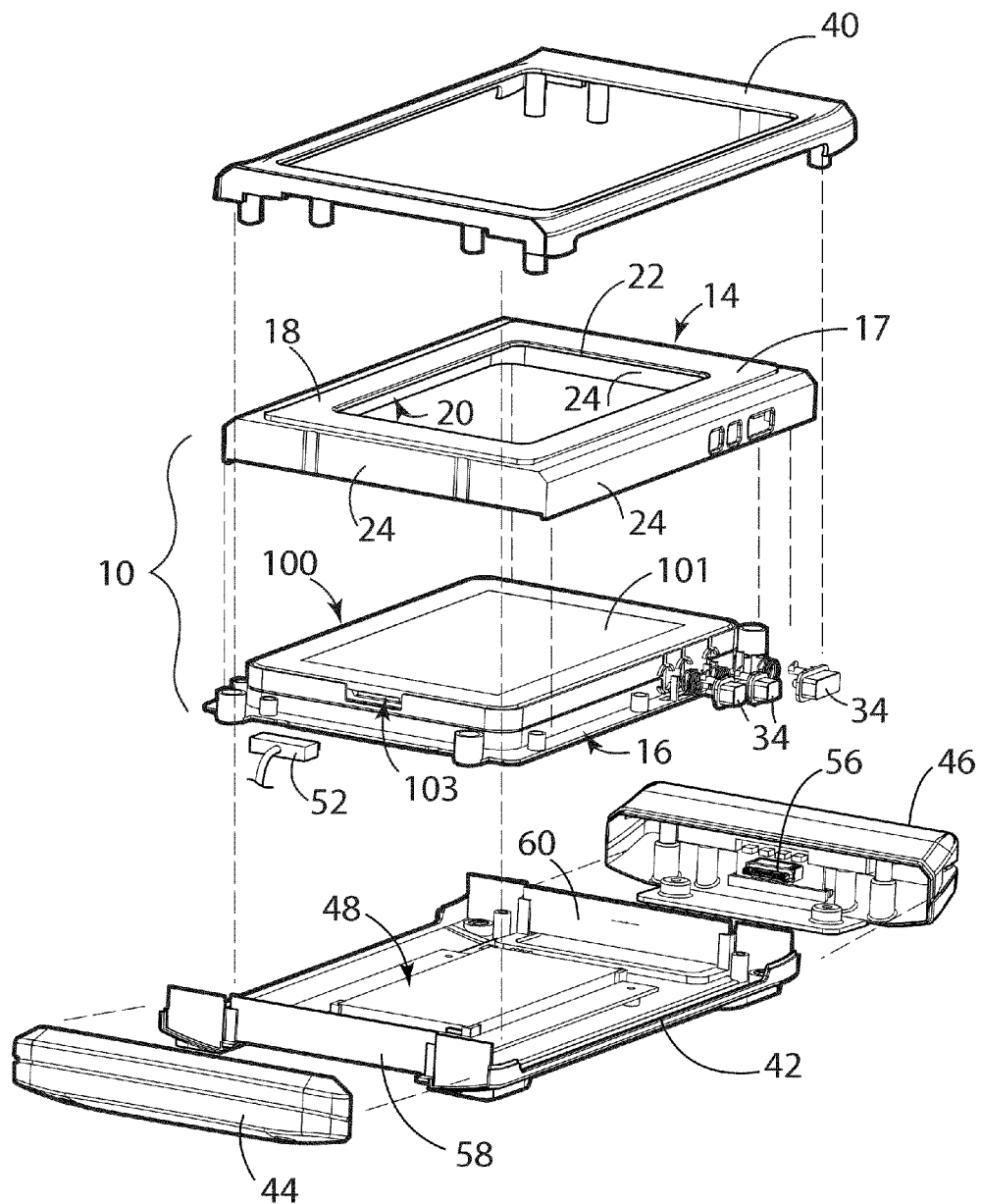
FIG. 2 is a partially exploded view of the modular assembly of FIG. 1.

As shown in FIG. 2, in an embodiment, top portion 14 of tablet carrier 10 may include openings 25 for receipt of the carrier buttons 34 therethrough. Such openings 25 may be provided in one or more of the side walls 24, for example, and are not limited to the illustrated embodiment.

Three carrier buttons 34 are shown in the illustrated embodiments on one side of the modular case assembly 102 in the Figures; however, the illustrations are not intended to be limiting. Rather, any number of carrier buttons 34 can be provided on the modular case assembly 102, and the buttons may be provided in any number of locations (e.g., one or more of a top side, an edge, along a bottom side, or any other edge or surface).

Further, it is noted that use of a mechanical button like carrier button 34 with springs 36 as shown in FIG. 2 is not intended to be limiting. For example, a button that electronically communicates via a membrane switch by sending an electrical signal or command to a circuit board and/or controller (i.e., a electromechanical configuration) can be used in addition to or in place of the illustrated buttons of FIG. 2, for example. Additional details regarding electromechanical actuation of one or more buttons on the modular assembly 102 are described later in this disclosure.

It is not necessary that both the top and bottom portions 14, 16 have side walls that extend along the sides of the tablet computer 100, and only one may have the side wall(s). Thus, openings would only be used in that side wall. Also, it is also possible to have no side walls, and the top and bottom portions 14, 16 could be connected in sandwich relation to the tablet computer 100 by other means, such as posts or fasteners extending from one to the other, with open side to provide free access to all of the ports/buttons on the side of the tablet computer 100. Such an open-sided construction would still have features, such as projections, shoulders, or a partial wall(s) (such as at the corners) to fit closely to the tablet computer 100. Thus, the illustrated embodiment is not intended to be limiting.

In an embodiment, a tablet connector 52 in the form of a USB cable or other type of data carrier extends from a main circuit board 50 of the exterior housing 12 and is connected to the port of the tablet computer 100 through this cut-out opening 32B. A "connector" is defined as a device or system that is used to connect devices, e.g., tablet computer 100, end caps 44 and/or 46 and/or batteries 48 and/or 54, for communication purposes. Further details are described below.

As shown in FIGS. 2 and 4, the tablet carrier 10 is enclosed by the exterior housing 12. The exterior housing 12 provides overall enclosure and protection of the tablet computer 100 and components housed therein. The exterior housing 12 has a length and a width suitable to enclose the tablet carrier 10. The exterior housing 12 has a top 40, a bottom 42, a first end cap 44 and a second end cap 46. The exterior housing 12 contains at least one battery 48 and a controller for communication with the selected tablet computer 100. As shown in FIG. 4, in accordance with an embodiment, the exterior housing 12 can contain a first battery 48 and a second battery 54 when the modular assembly 102 is assembled around the tablet computer 100. The batteries can extend the battery life of the tablet computer 100. As shown, the controller can be provided in the form of and/or provided with a main circuit board 50, for example. The at least one battery 48 and the controller/main circuit board 50 are operatively connected to the one or more ports of the tablet computer so as to allow communication of power and data between the controller, the tablet computer, and a functional device of the (each) end cap, as well as to provide extended battery life of the housed tablet computer 100 (e.g., from a battery or power source in the modular case assembly 102). Further, the modular assembly parts can be connected for communication without requiring special software drivers or base tablet modification.

Throughout this description, it should be understood that reference to a "controller" includes a single controller or multiple (sub-) controllers that control specific functions related to devices including, but not limited to, the herein described tablet computer and functional device of an end cap. In the case of multiple controllers, such controllers can, but need not be, physically combined into a single device. Further, although the description refers to circuit boards being used as controllers, for example, it should be understood that any type or number of controllers can be used. The use of a circuit board, as shown in the Figures, is not intended to be limiting.

Referring back to the embodiment illustrated in FIG. 4, the circuit board 50, also referred to as a main circuit board, is configured to monitor and control communications between one or both of the end caps 44 and 46, as well as monitor, control, and/or contain management of the battery supply, provide intelligence, etc. For example, the circuit board 50 can be used to monitor and determine when the tablet computer 100 is losing power, and can use its controller to increase power from one of the housed batteries 48 or 54 (additional details discussed later with respect to FIG. 23, for example). The circuit board 50 has connectors for attaching functional devices (e.g., in end caps). Its controller can be any type of microcontroller or microprocessor.

Figure 3:
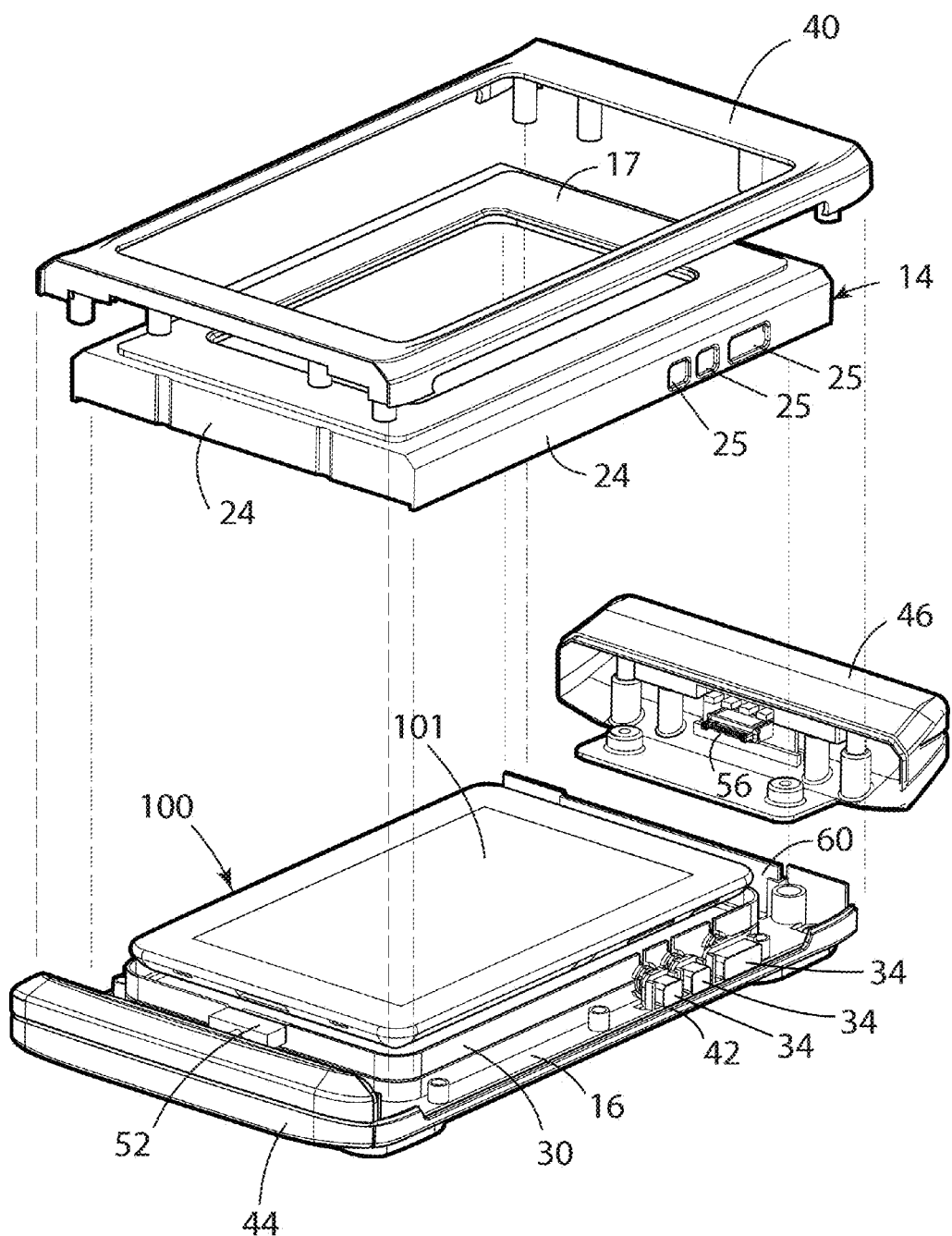
FIG. 3 is a partially exploded view of the modular assembly of FIG. 1.

The circuit board 50 is connected to the tablet computer 100 using tablet connector 52, such as a USB connector or other connector that can communicate both data and electrical power, as shown in FIG. 4. The tablet connector 52 is plugged into the slot 103 or data communication port in the bottom of the tablet computer 100, for example, as shown in FIG. 3. Further, because this slot 103 is an I/O interface, it allows the tablet connector 52 (when connected to the tablet computer 100) to be used to provide power and communications between the tablet computer and the controller/circuit board 50.

The first end cap 44 and the second end cap 46 are configured for installation (e.g., via alignment and locking) with ends of the top 40 and the bottom 42 of the exterior housing 12 (on an outer periphery thereof). The end caps 44 and 46 can be fully mobile when installed (e.g., see FIG. 1) or stationary, e.g., in a docket configuration (e.g., see FIG. 14). At least one of, if not both, of the first end cap 44 and/or the second end cap 46 are configured to provide a function via a functional device that, when coupled with the exterior housing 12 and tablet carrier 10, provides tailored functionality to the tablet computer 100. One or more devices can be housed within the end caps 44 and/or 46 to implement an intended function. At least one (if not both) of the first and/or second end cap portions 44 and/or 46, when attached to external housing 12, is configured to communicate with the controller/main circuit board 50 (and thus the tablet computer 100) via a connector 56. Referring back to FIG. 2, for example, additional controllers in the form of printed circuit boards 58 and 60, for example, can be provided and mounted in exterior housing 12 to facilitate communication between end caps 44 and 46 and the controller/main circuit board 50. Each controller or board 58 and 60 can be aligned with and held vertically in slot areas provided along edges or ends of the bottom 42 of the exterior housing 12 to align with connector(s) 56 within the end caps 44 and 46, for example. The circuit boards 58 and 60 can be used to send communications between the functional devices associated with the end caps 44 and 46 and the main controller/circuit board 50. In an embodiment, shown in FIG. 4, the circuit board 60 includes a connector device 62 that connects to connector 56 of the second end cap 46. Similarly, although not shown, the circuit board 58 can include a connector device that connects to a connector of the first end cap 44.

Figure 5:
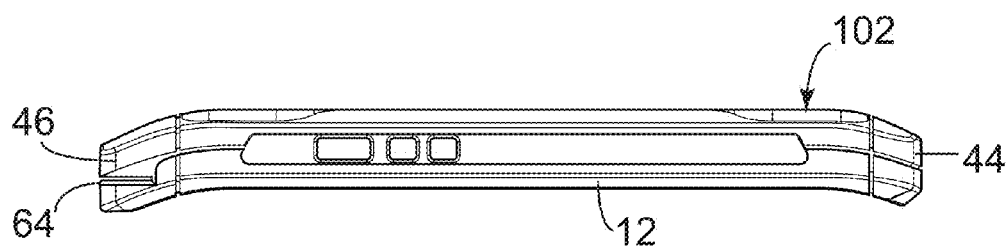
FIG. 5 is a first side view of the electronic device with the installed modular assembly in accordance with an embodiment of this disclosure.
Figure 6:
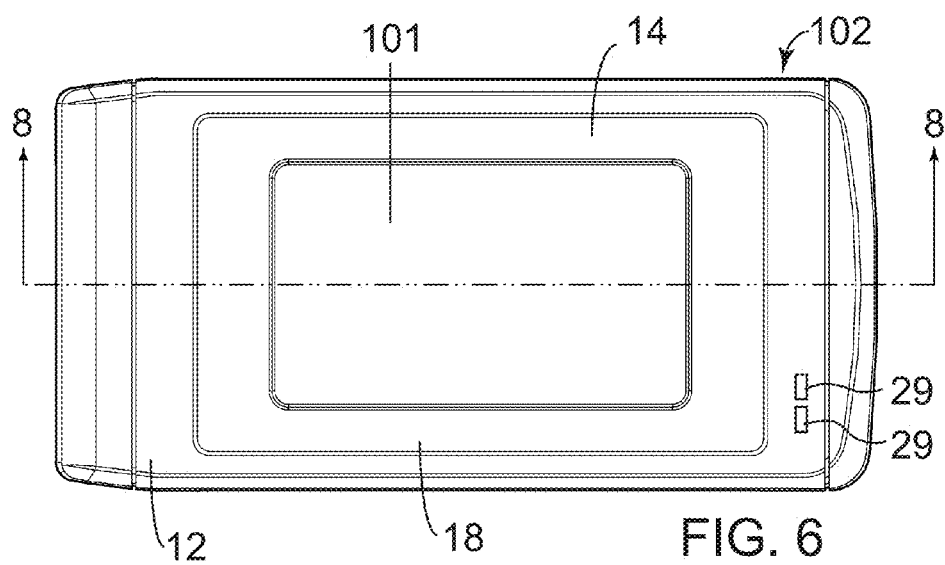
FIG. 6 is a top view of the electronic device with the installed modular assembly in a horizontal position.
Figure 7:
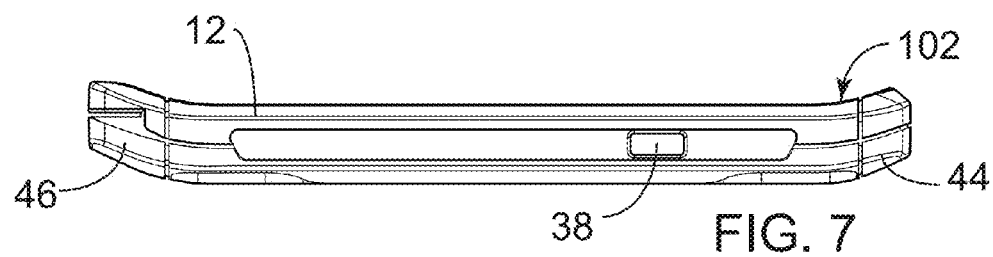
FIG. 7 is a second side view of the electronic device with the installed modular assembly.
Figure 8:
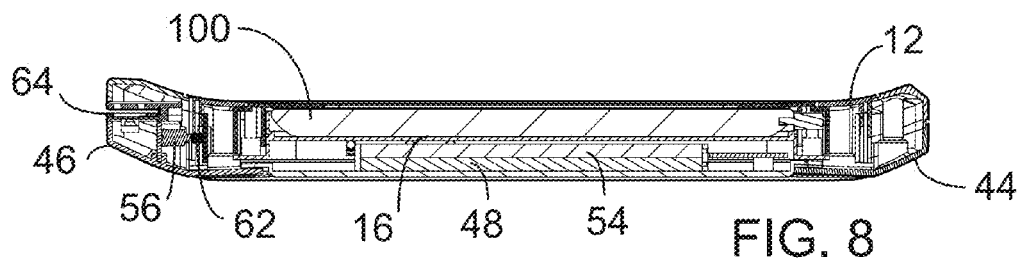
FIG. 8 is a cross sectional view along line 8-8 of FIG. 6.

As an example, FIGS. 4, 5, and 8 illustrates second end cap 46 with a receiving slot 64 associated with a magnetic strip reader (MSR) device and/or writer, which can be used for sliding credit card(s) 67 and/or other cards with magnetic strips therethrough. The magnetic strip reader within the second end cap 46 can have its own electronics or circuit board 66 (see FIG. 4) that is connected via connector 56 to connector device 62 of circuit board 60. When assembled and activated for use, the magnetic strip reader can read information from a card that is swiped through the receiving slot 64, and communicate such information for processing and/or use via its circuit board 66, to circuit board 60 and then to the main circuit board 50 and/or tablet computer 100 to complete a transaction, for example.

Although the above noted Figures and description show and describe connectors 52, 56 and connector device 62 each as a physical connector, it should be understood that the modular assembly 102 is not limited to such devices. Rather, a connector (and/or a connector device) may, in some embodiments, be provided and implemented via a wireless connection, e.g., using a short-range wireless technology, such as Bluetooth®, to connect and allow communication between the end caps 44, 46, the enclosed selected tablet computer 100, and/or batteries 48 and 54 (e.g., via their circuit boards).

Figure 14:
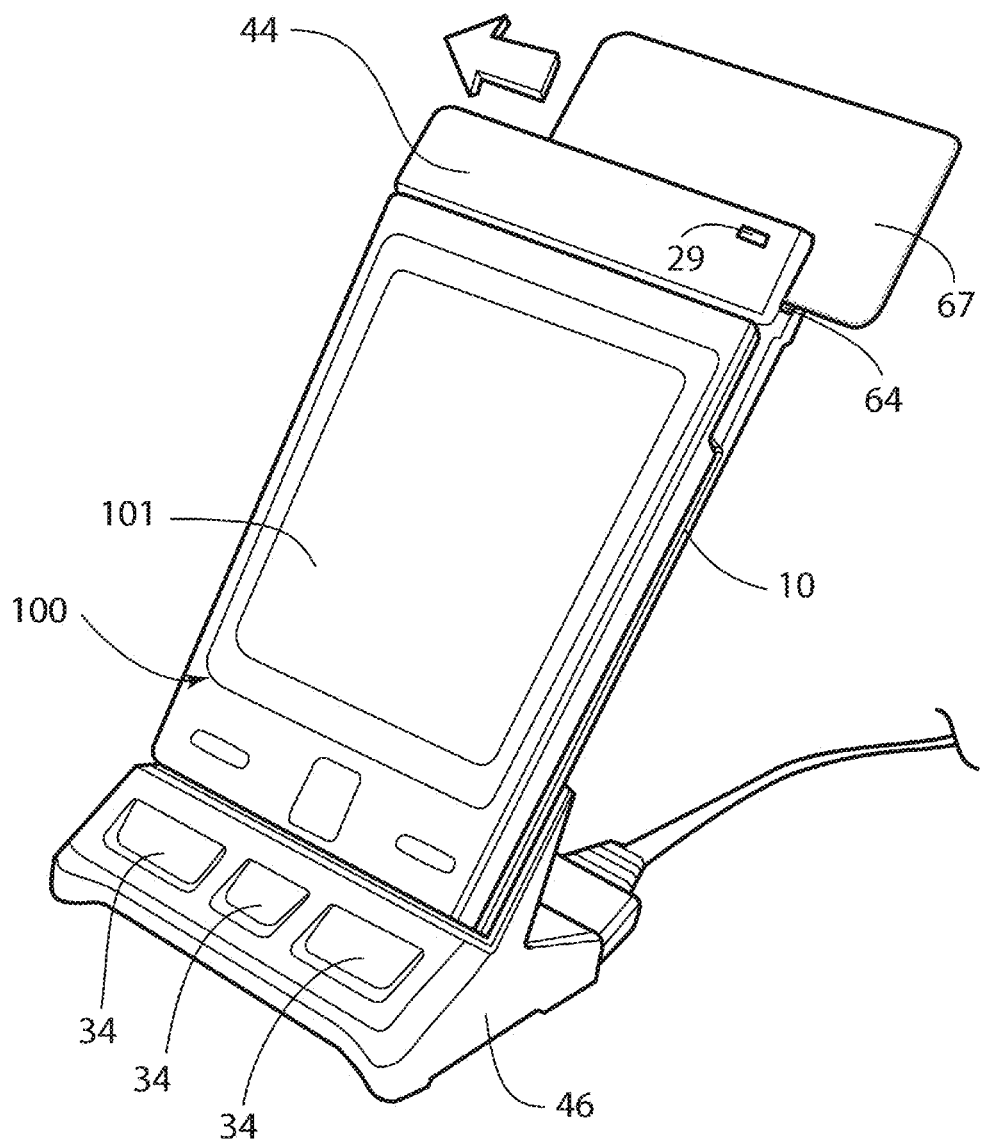
FIG. 14 is a perspective view of an electronic device with an installed modular assembly in accordance with yet another embodiment of this disclosure.
Figure 15:
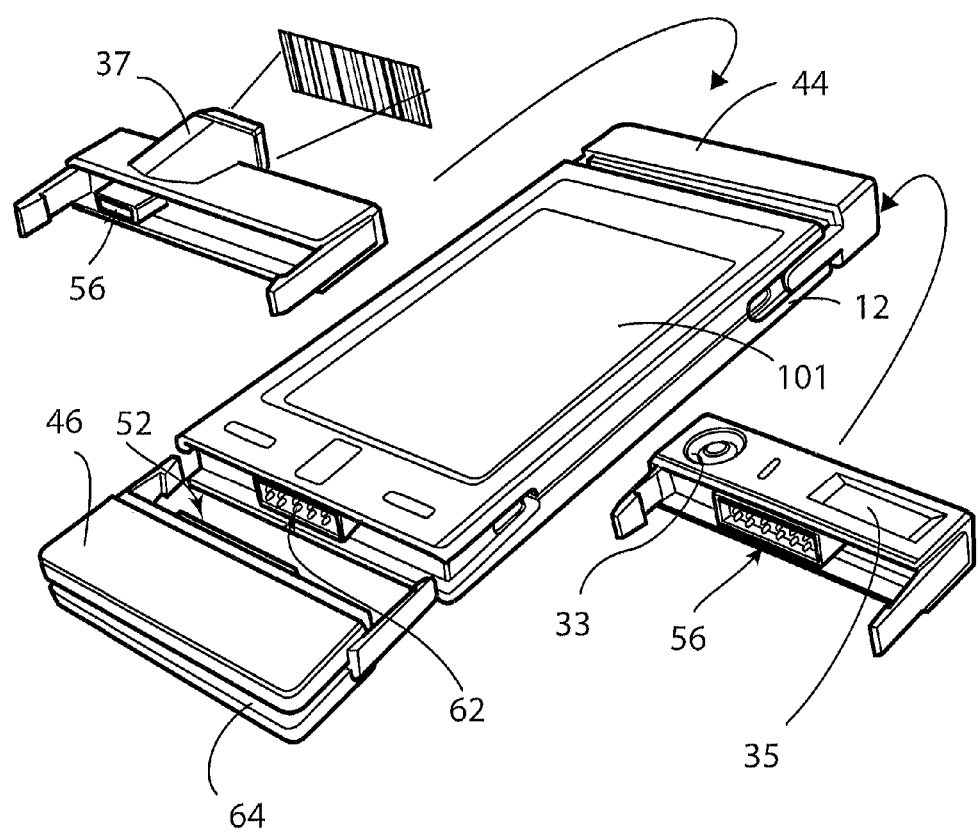
FIG. 15 is a perspective view of an electronic device with different end caps that can be used as part of a modular assembly in accordance with still yet another embodiment of this disclosure.
Figure 16:
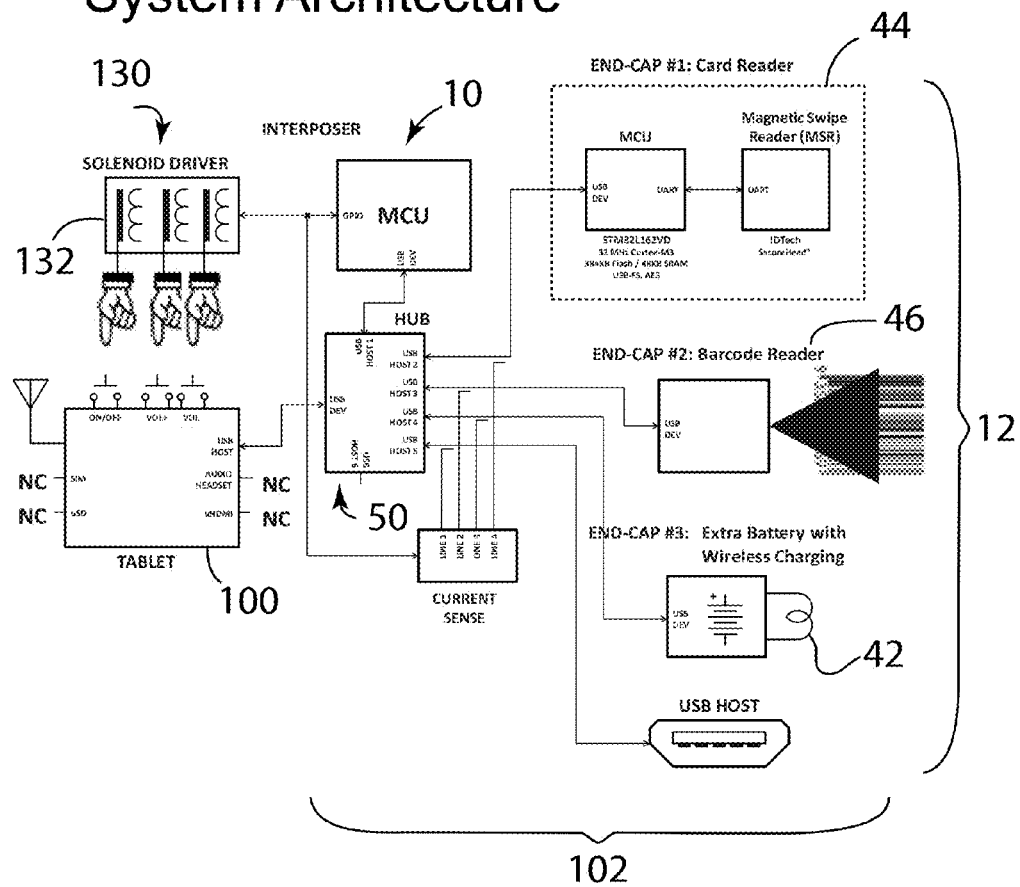
FIG. 16 is a schematic diagram of the system architecture for the electronic device with an installed modular assembly in accordance with an embodiment.

The functions and functional devices or modules of either or both end cap portions 44 and 46, however, are not intended to be limited. The end cap functions may include, but are not limited to, providing enhanced durability and shock/vibration protection; providing one or more of: speaker(s), microphone(s), camera(s) 33 and associated accessories (e.g., flash) (e.g., see FIG. 15), gaming buttons, audio jack, and a DC jack; providing printing capabilities such as a receipt printer (e.g., thermal printer); providing secure swipe support with magnetic card reader (see FIG. 15) (e.g., read-only and read-write capabilities); providing enhanced payment features such as EMV/NFC support for contactless payment applications (e.g., for credit cards or other cards with NFC communication) and/or providing smart card reader, support and/or chip and pin access reading/interface capability; providing I/O expansion; providing RFID, HDMI and/or USB reading and/or host capabilities; providing biometric identification (ID) swipe/security module 35 such as a fingerprint scanner; providing a laser bar code scanner 37 (see FIG. 15) (e.g., 1-D and 2-D laser barcode scanning capabilities) or other scanning capabilities; and providing a battery and/or a power booster, such as hot swappable battery solutions that add capacity and wireless charging of the tablet in either a plug-in format (e.g., see FIG. 14, showing a power charger in the form of an upright stand) or as a mobile or portable battery device, acting as its own power source, in the end cap which may be used to supply power to the enclosed tablet computer 100 (e.g., see FIG. 16, showing end cap with extra battery, for (optional) wireless charging). The functions of the first and/or second end caps 44 and/or 46 can be tailored for and/or in communication or use with customer relationship management (CRM) applications, mapping/intelligent routing applications, scanning applications, GPS/geo-tracking applications, hosted content management and delivery applications, image capture and/or upload applications, and the like, which may be provided in the main circuit board 50 and/or the tablet computer 100.

In accordance with an embodiment, the first and second end cap portions 44 and 46 are configured to be interchangeable with one or more replacement end caps comprising different functional devices providing different functions.

Figure 13:
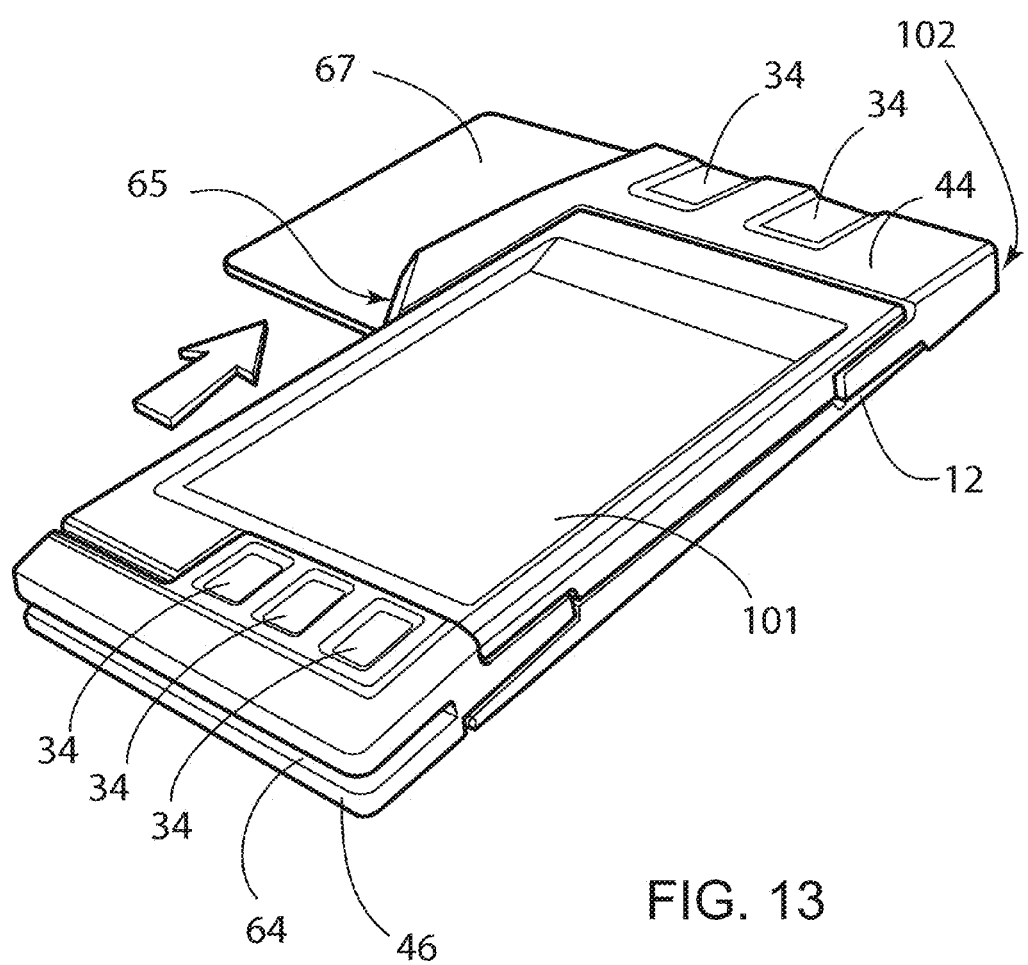
FIG. 13 is a perspective view of an electronic device with an installed modular assembly in accordance with another embodiment of this disclosure.

Moreover, a location of parts and the devices on or within the end cap portions 44 or 46 is also not limited. For example, FIG. 13 illustrates another embodiment wherein a receiving slot 65 like slot 64 is provided on a side portion of an end cap 44 for swiping a card 67 therethrough.

In an embodiment, the end cap portions 44 and 46 can be provided as a set. In another embodiment, the end cap portions 44 and 46 are separate devices. The first end cap 44 can provide a different function than the second end cap 46. For example, as shown in FIG. 15, the first end cap 44 can provide a first function (e.g., barcode scanner or security module), while the second end cap 46 provides a second function that is different than the first function (e.g., card swipe module).

Accordingly, it should be understood that any number of modular assemblies can be manufactured and installed on tablet computers to provide multiple assemblies with one or more functions included in the end cap portions. To install one or more module assemblies around one or more tablet computers, the tablet computer 100 can be aligned and placed in the bottom portion 16 of the tablet carrier 10, as shown in FIG. 2. Carrier buttons 34 and springs 36 (optional) can be installed or already installed in place in the bottom portion 16. The top portion 14 is aligned with the bottom portion 16 of the tablet carrier and can be installed in place to surround the tablet computer 100. Alternatively, the bottom portion 16 of the tablet carrier 10 can first be installed and secured to the bottom 42 of the exterior housing, as shown in FIG. 3, by operatively connecting the at least one battery 48 and optionally battery 54 and the main circuit board 50 contained by the exterior housing 12 (e.g., in bottom 42, as shown in FIG. 4) to the tablet computer 100, such as by USB tablet connector 52 (or a wireless connector). Then the exterior housing 12 is assembled. If not yet secured, the tablet computer 100 with tablet carrier 10 can be aligned and/or installed on bottom 42 of exterior housing 12. Then, first and second ends cap 44 and 46 are aligned and connected to the bottom 42, as shown in FIG. 3. This includes connecting the connector 56 of the functional device (e.g., MSR) of the second end cap portion 46 (and/or the first end cap portion 44) to the connector device 62 of the circuit board 60, which is in communication with the main circuit board 50, thereby allowing communication of power and data between the second end cap portion 46 (and/or first end cap portion 44) and the controller/main circuit board 50 and the tablet computer 100 (or, alternatively, wirelessly connecting the end caps 44 and 46). After the end caps 44 and 46 are installed, the top portion 14 of the tablet carrier 10 can be aligned and connected with the bottom portion 16 (if not already). Then, the top 40 of the exterior housing 12 is aligned and locked with the bottom 42 to enclose the tablet computer 100, as shown in FIG. 1 and in FIGS. 6 and 10.

When a plurality of tablet computers having varying lengths and/or widths and one or more ports and button configurations are provided, a plurality of modular assemblies may be installed around the tablet computers. Accordingly, this disclosure further provides a method for installing a plurality of modular assemblies around a plurality of tablet computers having varying lengths and/or width and one or more ports and button configurations, resulting in a substantially universal case (and design) when installed on different types of tablets. This method includes providing first tablet carriers that are each configured to encase a first type of tablet computer when the carriers are installed on their corresponding tablet computers and providing second tablet carriers that are each configured to encase a second type of tablet computer when the carriers are installed on their corresponding tablet computers, the second type of tablet computer being different than the first type of tablet computer. Common exterior housings that are each configured to enclose the first and second tablet carriers once the first and second tablet carriers are installed on their corresponding tablet computers are also provided, as well as end cap portions. The top portions and the bottom portions of the first and the second tablet carriers each have internal surfaces for retaining the respective first and second types of tablet computers while still providing access to the one or more ports and buttons of the first and second types of tablet computers when the first and second tablet carriers are installed therearound.

Accordingly, the first tablet carriers can be installed in place with respect to corresponding first type of tablet computers, and the second tablet carriers can be installed in place with respect to corresponding second type of tablet computers. The common exterior housings are installed to enclose the first and second tablet carriers with the respective first and second types of tablet computers by aligning and locking the top and the bottom of each common exterior housing and selected end cap portions therewith, and the battery(ies) and the controllers of each are operatively connected to one or more ports of each of the corresponding tablet computers so as to allow communication of power and data between the controllers, the corresponding tablet computers, and the selected end cap portions.

To change the first cap 44 and/or the second end cap 46, the first and/or second end caps are removed from the exterior housing 12 by disconnecting the connector 56 of the first and/or second end caps from the connector 62, thus disconnecting it from communication with the main controller/circuit board 50 (or, alternatively, one can wirelessly disconnect the devices). A replacement end cap that is configured to provide a different function (via a functional device) than the specified function of the removed first and/or second end caps is selected and its connector can be connected to the main circuit board (via connection of the connectors 56 and 62) to allow communication between the functional device of the at least one replacement end cap and the main circuit board 50. Then, installation can be completed by installing (e.g., aligning and locking) the at least one replacement end cap with the top 40 and the bottom 42 of the exterior housing 12 around the installed tablet carrier 10.

In an embodiment, the tablet carrier 10 and/or exterior housing 12 may include one or more indicators 29 in the form of lights or LEDs, for example. Each of the indicators 29 may be illuminated when power is supplied to the tablet carrier 10 and tablet computer 100. In an embodiment, LEDs are implemented within the tablet carrier 10 and are configured to indicate a specific action associated with the tablet carrier. For example, the LEDs may change their emittance pattern and/or color(s) when a specific action is applied by a user, or if an action needs to be taken by a user (e.g., the LEDs may change color if the battery state of charge is low, or if an end cap 44 and/or 46 is removed). The application of LEDs and/or other indicators in such a manner should be understood by one of skill in the art and therefore is not further explained in detail herein.

In an embodiment, the tablet carrier 10 and/or exterior housing 12 may also or alternatively include one or more programmable buttons. The programmable button(s) can be used for communicating with the tablet computer 100 to implement a specified function via at least the circuit board 50 when connected for communication with the corresponding tablet computer 100. Programmable button(s) allow for ease of programming and tailoring of tablet functionality. The programmable button(s) can be associated with a controller that is configured to automatically actuate or implement the assigned function.

The one or more programmable buttons may be one of the previously mentioned buttons 34 and/or an additional button provided on the tablet carrier 10 itself. It can be provided on any side or surface of the modular assembly 102.

In an embodiment, the one or more programmable buttons are configured to electromechanically actuate a button, a program, or an application associated with the tablet computer 100. One or more actuators 130 for actuating the one or more buttons on the tablet computer 100 can be provided on the interposer/tablet carrier 10 and/or the external housing 12. An "actuator" 130 in this disclosure refers to a device (alone or part of a system) that is configured to actuate (e.g., press) one or more buttons on the tablet computer. The one or more programmable button(s) are configured to cause at least one of the one or more actuators to actuate its corresponding button. An actuator such as a solenoid (or micro-solenoid) and/or solenoid driver 132 (see FIG. 16) can be utilized, for example, in accordance with an embodiment. In another embodiment, a shape memory material 134 (described later with reference to FIGS. 26-27) can be used as an actuator. In another embodiment, a mercury switch can be used as an actuator. In yet another embodiment, compressed air may be used as an actuator. For example, a device such as a $CO_2$ cartridge may be provided in the carrier 10 to apply a force of compressed air to actuate the buttons on the tablet computer 100. The type of actuator 130 provided in the modular assembly 102 is not intended to be limited.

The programmable button(s) can cause at least one of the one or more actuators 130 to actuate its corresponding button on the tablet computer 100. Particularly, in accordance with embodiments herein, the corresponding button(s) are activated remotely by pressing the programmable buttons. That is, the programmable button(s) may not necessarily be configured to be in direct alignment with the buttons on the tablet computer, but, rather, the programmable buttons may be provided in a different location from the buttons on the tablet computer, and thus are configured to actuate one or more of the buttons on the tablet computer 100 via the actuator in a substantially remote manner. Accordingly, in embodiments, the programmable button(s) do not need to directly contact the button(s) on the tablet computer 100 or be in direct alignment therewith to have direct actuation thereof. That is, in an embodiment, at least one programmable button is provided on a first axis for actuational movement along the first axis (e.g., along the axis in a linear fashion by pressing the button inwardly), and the corresponding button on the tablet computer 100 configured for actuation via at least one actuator 130 is provided on a second axis for actuational movement along the second axis, but the first axis and second axis are different from each other. In an embodiment, the location of the programmable button(s) on the modular assembly 102 is different than the locations of the button(s) of the tablet computer 100. For example, the programmable button(s) may be provided on one side or surface, while the button(s) to be actuated on the tablet computer 100 are provided on another side or surface. The actuator(s) 130 can be utilized individually or as part of an actuating system.

As another example, in embodiments, the programmable button(s) of the modular assembly 102 and the actuated button(s) of the tablet computer 100 may be provided on the same side, but not are not axially aligned. In an embodiment, the programmable button is provided on a plane that is parallel to a plane of the corresponding button. For example, the programmable button may be provided at, near, or adjacent a lower or bottom right side of the modular assembly 102, while the actuated button of the tablet computer 100 is provided at, near, or adjacent an upper right side of the tablet computer 100.

In an embodiment, the programmable button is provided on a plane that is perpendicular to a plane of the corresponding button. For example, the programmable button may be provided on a right side of the modular assembly 102, while the actuated button of the tablet computer 100 is provided on an upper or top side of the tablet computer 100. Thus, the programmable button(s) may indirectly cause actuation or activation of buttons on a tablet computer 100 inside the enclosure, held inside the carrier 10, without being directly or substantially aligned with each other along the same actuation axis.

As previously noted, the actuator may be part of an actuation system used to cause motion to another (mechanical) device that in turn actuates the buttons of the tablet computer 100. To actuate the buttons of the embedded tablet computer 100 indirectly in the exemplary manners noted above, one or more mechanical devices may be used. An actuator may directly actuate a corresponding button on the tablet computer 100, or it may actuate another device to indirectly actuate the corresponding button on the tablet computer 100. In an embodiment, one or more mechanical devices may be associated with the one or more actuators 130 in the modular assembly 102. The one or more actuators 130 may be configured to activate movement of the one or more mechanical devices to thereby actuate a corresponding button on the tablet computer. Accordingly, when installing the first and second tablet carriers or the installing of the common exterior housings around varying types of tablet computers, the method may include aligning the one or more mechanical devices relative to the tablet computer for actuating the corresponding button on the tablet computer. This alignment may simply take place by inserting or installing the tablet computer 100 into the modular assembly, since the placement of the actuator(s) 130 and mechanical device(s) can be customized, like the tablet carriers, based on the type of tablet computer or electronic device to be held therein.

Figure 20:
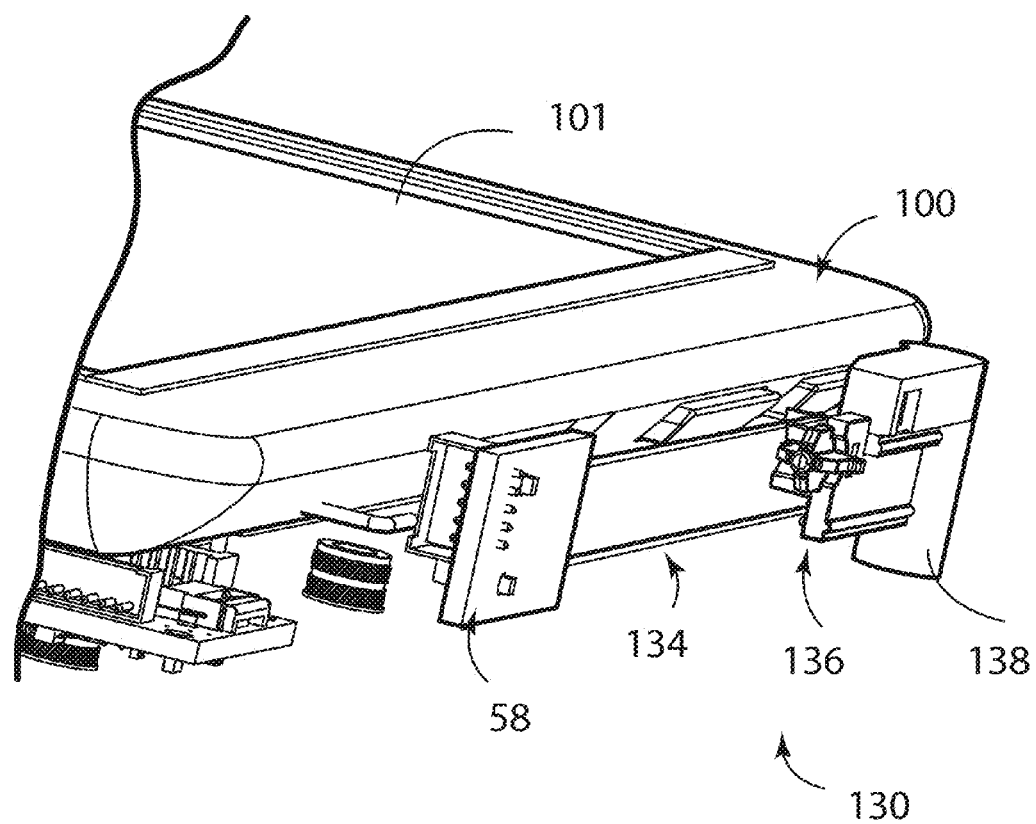
FIGS. 20-21 illustrate an embodiment of an actuation system, provided within the modular assembly, having an actuator and mechanical devices for actuating a button of the enclosed tablet computer.
Figure 21:
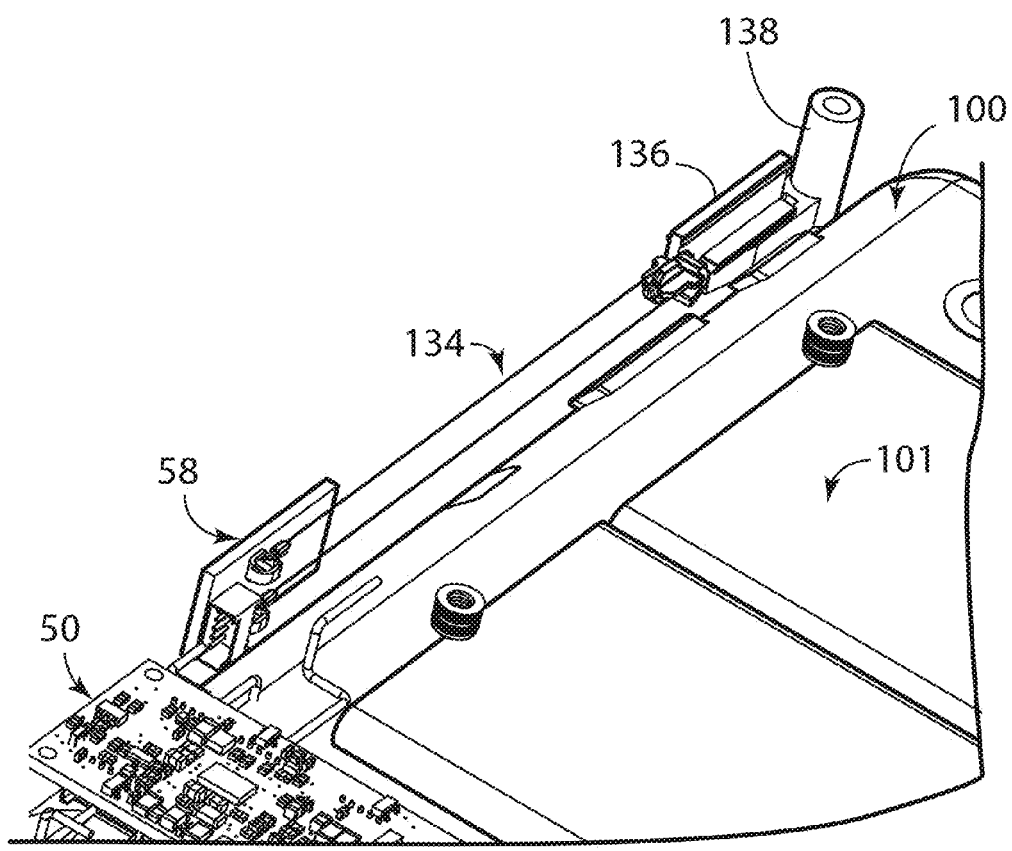
Figure 31:
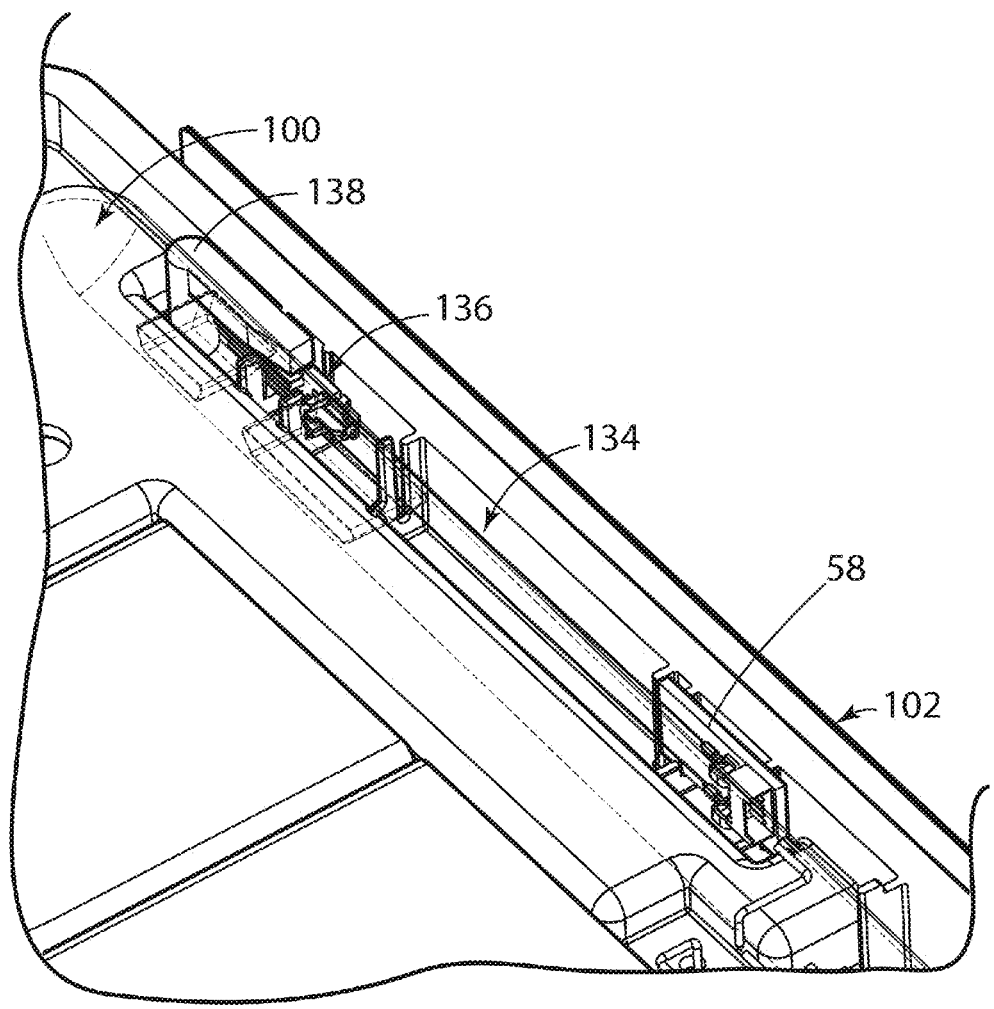
FIGS. 31-32 illustrate alternate views of the exemplary mechanical devices shown in FIGS. 20-21 and modular assembly in accordance with an embodiment.
Figure 32:
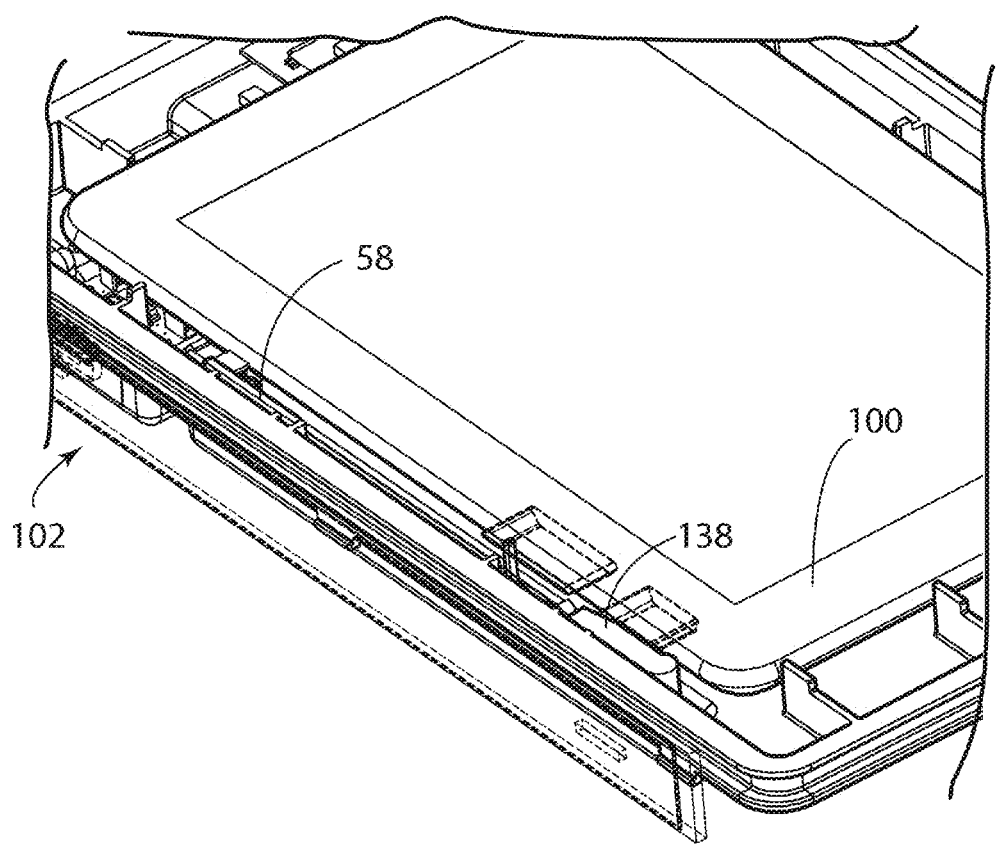

FIGS. 20-24 and 31-32 show an example of an actuator 130 of shape memory material used along with mechanical devices for electromechanically actuating a button on the tablet computer 100, in accordance with an embodiment. FIGS. 20-21 show a top perspective and an underside perspective view, respectively, of an exemplary circuit board 58 in the modular assembly 102 (outer parts not shown here for simplicity and explanatory purposes only) with a shape memory wire 134 connected thereto, along with mechanical devices in the form of an activator 136 and a rotatable crank arm 138, as used in a modular assembly 102 for tablet computer 100. FIG. 31 show an alternate top perspective view and a side perspective view of these exemplary devices in modular assembly 102 with tablet computer 100. It should be noted that the rotatable crank arm 138 is shown in phantom lines in FIGS. 22-24 simply for explanatory purposes such that features relating to both the rotatable crank arm 138 and the activator 136 can be viewed and understood.

Figure 22:
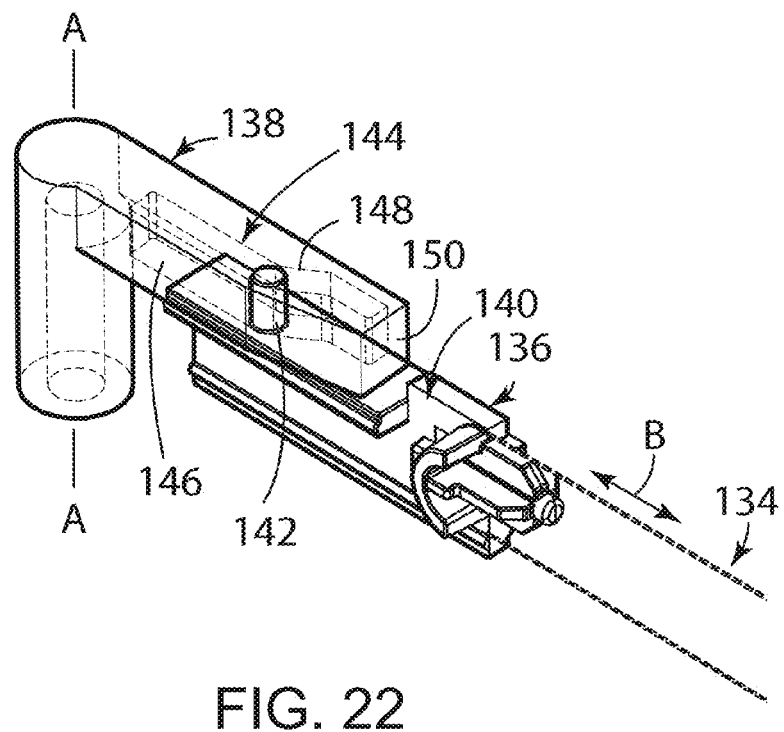
FIGS. 22-24 illustrate relative movement of the mechanical devices shown in FIGS. 20-21.

As seen in FIG. 22, for example, the activator 136 includes a body with a receiving portion 140 at or near one end for looping or wrapping the shape memory wire 134 therearound. The shape memory wire 134 is thus also connected to the activator 136. The shape memory wire 134 (see FIG. 20) is configured to impart linear motion to the activator 136, as represented by arrow B. At or near an opposite end of the body of the activator 136 is a guide portion 142 that extends vertically for insertion into a slot 144 of the rotatable crank arm 138. The rotatable crank arm 138 has a body configured for rotation about an axis A-A with an arm extending therefrom. As shown in FIG. 20 and FIG. 21, at least a portion of the arm is aligned adjacent to a button on the tablet computer 100.

The arm includes the slot 144 on its underside. As shown in FIG. 22, the slot 144 may include one or more linear and angled portions 146, 148, and 150. The guide portion 142 is inserted into and provided in the slot 144. By moving the activator 136 in a linear fashion via the shape memory wire 134, the activator 136 is configured to impart rotational motion to the rotatable crank arm 138 such that its arm can mechanically actuate (e.g., press) a button the tablet computer 100 (part of its arm moves to press and move the button along its actuational axis). That is, as the crank arm 138 rotates about axis A-A, its extended arm moves or pivots towards a button on the tablet computer 100 to push and move the button along its actuational axis.

Figure 23:
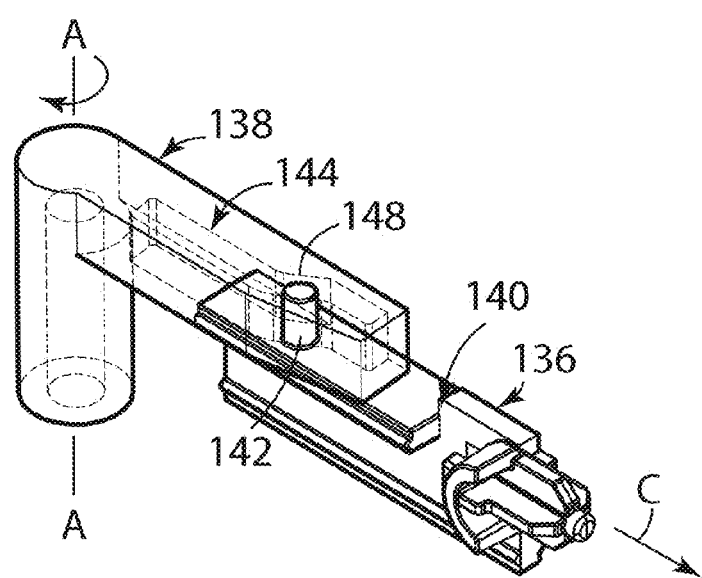
Figure 24:
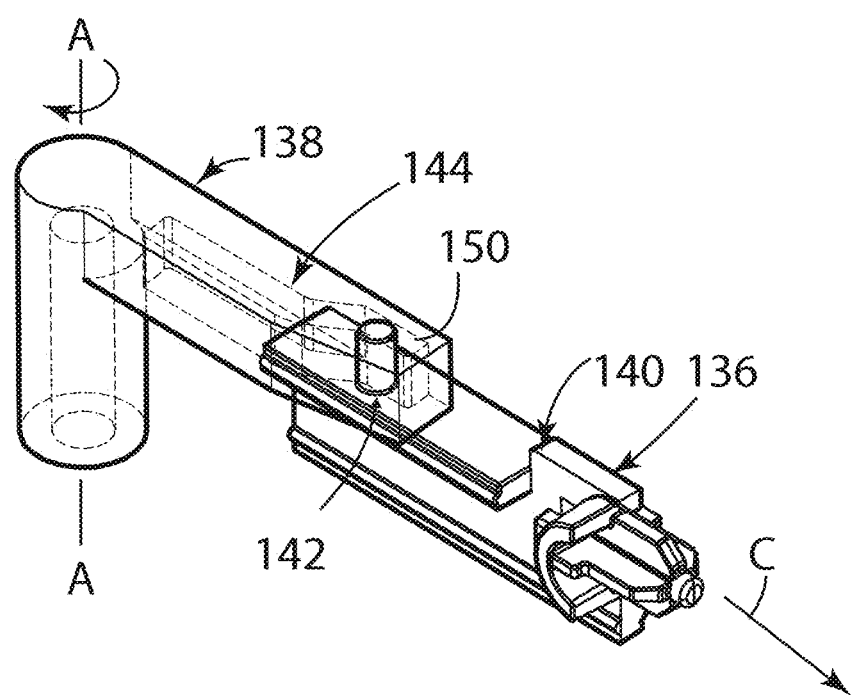
Figure 28:
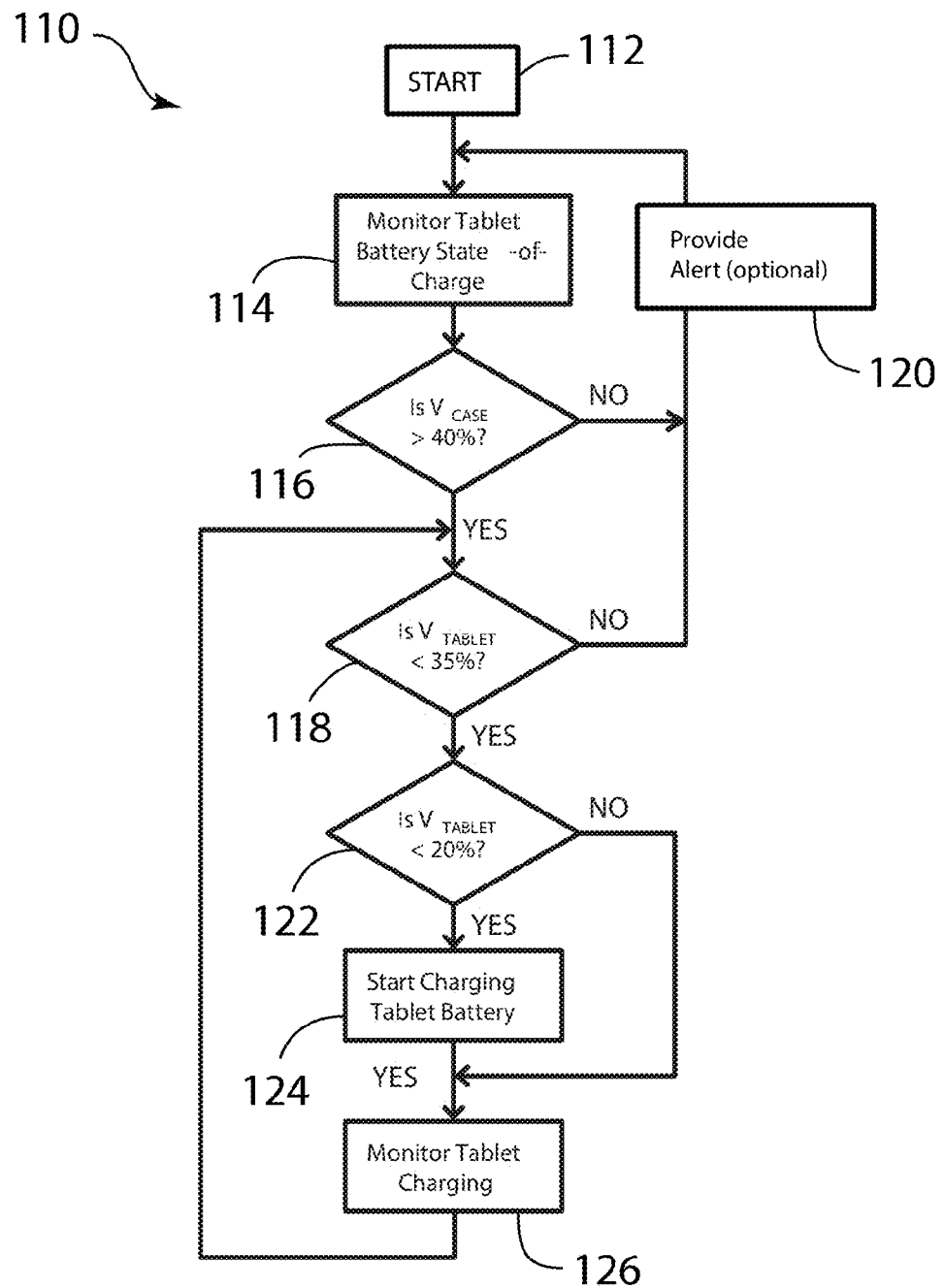
FIG. 28 shows a flow chart illustrating a method for monitoring the battery status and controlling a state of charge of the battery in the tablet computer.
Figure 29:
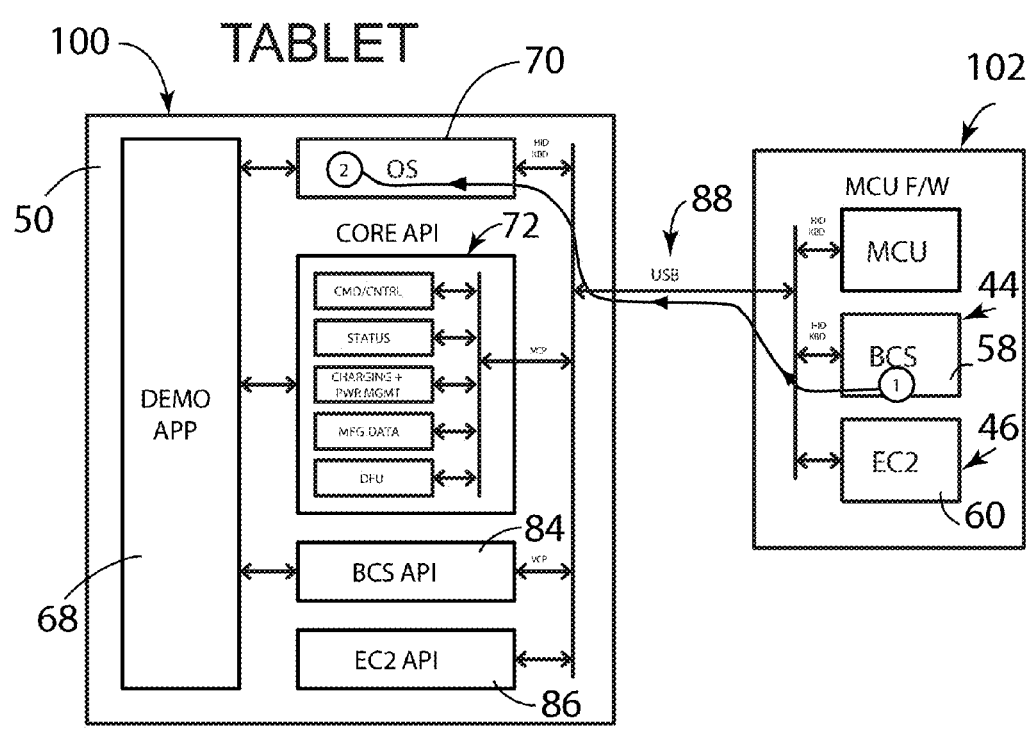
FIG. 29 illustrates a flow diagram of traditional communication between modules of software and firmware in a tablet computer and a bar code scanner/functional device.
Figure 30:
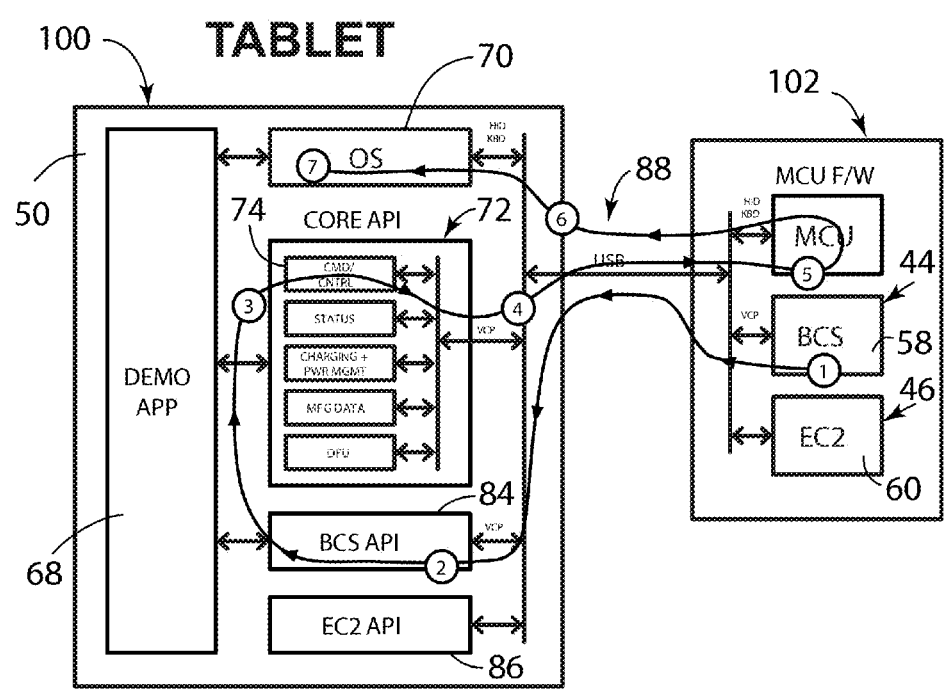
FIG. 30 illustrates an exemplary flow diagram of altered communication between modules of software and firmware in the tablet computer and modular assembly, in accordance with an embodiment.

When the programmable button is pressed and moved along its own actuational axis, for example, a signal is sent to the circuit board 58. The circuit board 58 sends current to the shape memory wire 134, which shrinks and results in the linear motion of the activator 136 in the direction indicated by arrow C in FIG. 23. The applied linear motion of the activator 136 rotates the crank arm 138. FIGS. 28-30 show in greater detail an example of relative movement of activator 136 and crank arm 138. As the shape memory wire 134 is actuated (via current from the circuit board 58) and shrinks, the body of activator 136 is linearly pulled in the direction of arrow C, which in turn moves the guide portion 142 from a linear portion 146 of the slot 144 and into the angled portion 148, shown in FIG. 23, and then into the linear portion 150 of the slot 144, as shown in FIG. 24. This linear movement of the activator 136 results in the rotational movement of the crank arm about axis A-A, as also shown in FIGS. 23-24.

The rotational movement of the crank arm 138 about axis A-A causes the arm to actuate, press, or stroke the adjacent button on the tablet computer 100 and move it along its actuational axis. The button stroke and/or rotation of the crank arm 138 may be minimal but sufficient to press or actuate the adjacent button of the tablet computer 100 and move it in the direction along its axis.

In an embodiment, the movement of the crank arm 138 is approximately 1 millimeter (mm).

Of course, as noted above, use of a shape memory material is one example of an actuator 130. Alternative devices or methods may be used to actuate buttons on the tablet computer 100 using the programmable button(s) without departing from the scope of this disclosure.

As shown in FIG. 4, additional opening 32C can be provided on side wall 30C of tablet carrier 10 for receipt of another button 38 (and optional spring 36) that is configured for communication with the tablet computer 100. In accordance with an embodiment, button 38 is a programmable button.

Because the programmable button uses electromechanical actuation as opposed to a physical actuation, a button or function on the tablet computer 100 can be actuated despite its external button configuration. The location of the programmable button can be different than the location of a button on the tablet computer and it does not need to the aligned therewith. Since different types of tablets can have different button locations and configurations, many cases are manufactured to conform to button locations. That is, the actuator and/or actuation system associated with the programmable buttons is customizable based on the tablet computer 100 and/or subassembly designed for placement in the modular assembly 102. Thus, despite where buttons may be on the tablet computer 100, the actuator and/or actuation system can be assembled such that the programmable buttons are designed to actuate them. However, with at least one programmable button the modular assembly 102, the button configuration provided on the tablet(s) is not limiting. The modular assembly 102 can manipulate the actual physical tablet buttons independent of which tablet it is and its location. Accordingly, the modular assembly 102 can be installed on any number of types of tablets, without needing to move the position of the programmable button(s) on the tablet carrier 10 and/or external case 12.

Further, because the actuation is electromechanical, electricity to the actuator(s) and communication via the programmable button(s) can be controlled. For example, the programmable button may be deactivated to enhance security.

In accordance with an embodiment, the programmable button can be configured to implement its specified function (and/or other functions) based upon any number of initiation sequences, e.g., single push, double push, push and hold for a predetermined amount of time (e.g., thirty seconds), push and hold while pushing another button concurrently (e.g., power button or volume up/down key(s)). For example, the assigned sequence(s) can initiate a hard overall system reset, can run a system diagnostic and report results to end user, launch a specific software application or program, and/or launch combination software/hardware application (e.g., scan barcode, print, transmit data over WWAN).

FIG. 16 illustrates an example of a system architecture associated with the modular assembly 102 in accordance with an embodiment. Shown are a first end cap 44 with a magnetic swipe reader (MSR) and its microcontroller (MCU) or microprocessor, and a second end cap 46 with a barcode reader. The MSR communicates via its microcontroller with a hub of the main circuit board 50 provided in the tablet carrier 10 (or interposer). The barcode reader also communicates with this hub. Further, as shown, the bottom 42 of exterior housing 12 can act as a third end cap by housing one or more batteries therein, enabling extra battery power with wireless charging that is configured to communicate with the main circuit board 50.

Implementation of functions or actions by the end caps or by buttons such as a programmable button 38 can be controlled by the circuit board 50 and its microcontroller (MCU) in the tablet carrier 10. The tablet carrier 10 (or interposer) includes embedded software to control the system architecture, including a USB bus, as well as power management, the end cap peripheral interfaces and authentication, and microprocessor/controller control. A solenoid driver 132 (see FIG. 16) can be used as an actuator 130 to electromechanically activate the power and/or volume button(s) on the tablet computer 100, for example. The tablet computer 100 is configured to communicate with hub of the main circuit board 50 provided in tablet carrier 10.

In an embodiment, the modular assembly 102 includes embedded software for Mobile Device Management (MDM) in order to detect, monitor, and control specific systems, such as: determining if end cap portions 44 and 46 are presented, authenticated, and when last attached/installed; battery capacity and status of battery(ies) in exterior housing 12 and/or a power booster end cap portion (if attached); determining end cap function (e.g., diagnostic to determine if the end cap is functioning properly); determining MSR end cap payment key present (and type); suspending or shutting down an end cap portion; and configuring locking of the tablet computer if an end cap portion like 44 or 46 is removed and/or tampered with. Such examples, however, are not limiting.

Figure 25:
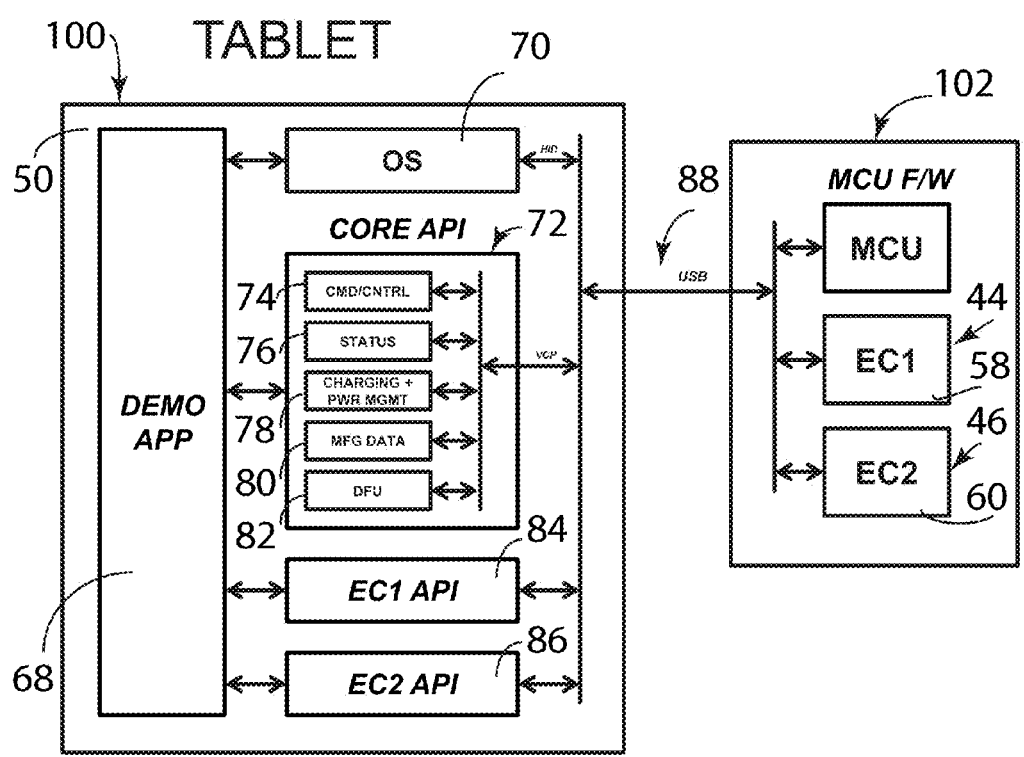
FIG. 25 shows a schematic diagram of an "open" USB-based architecture of software and firmware components associated with the tablet computer and the carrier, in accordance with an embodiment.
Figure 26:
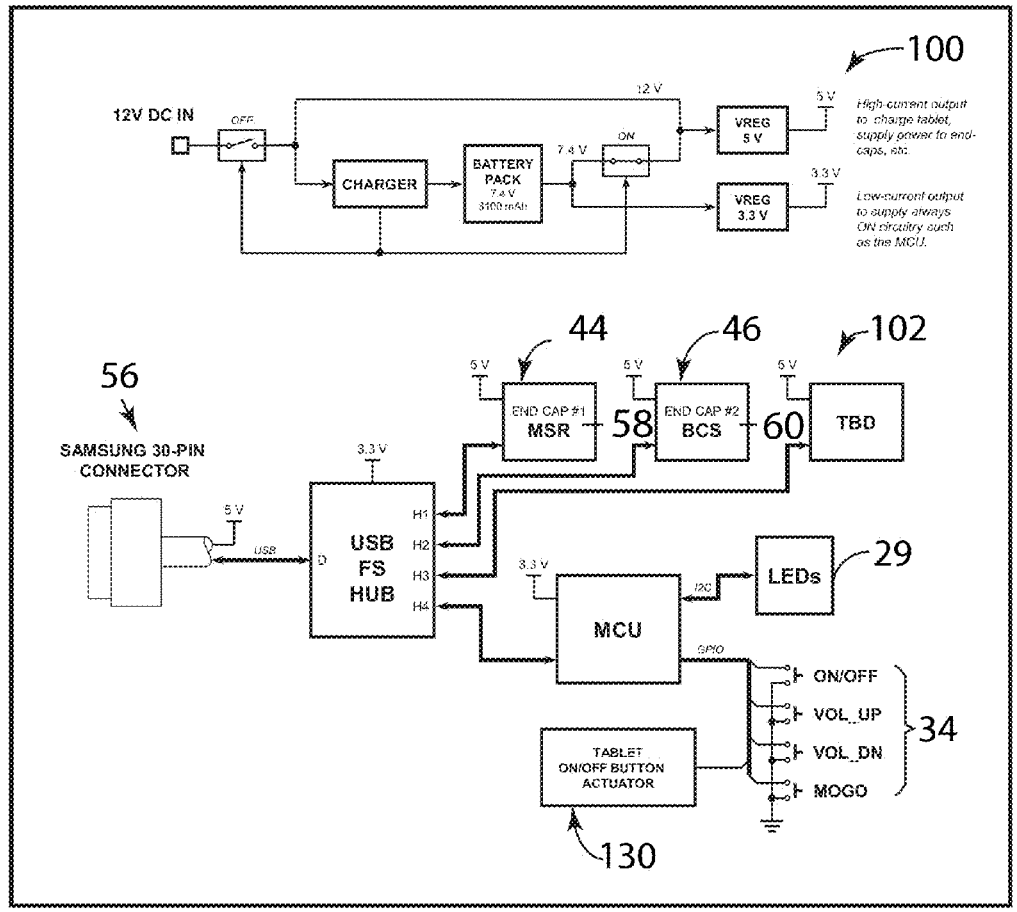
FIG. 26 shows circuits associated with the "open" USB-based architecture in accordance with an embodiment of this disclosure.
Figure 27:
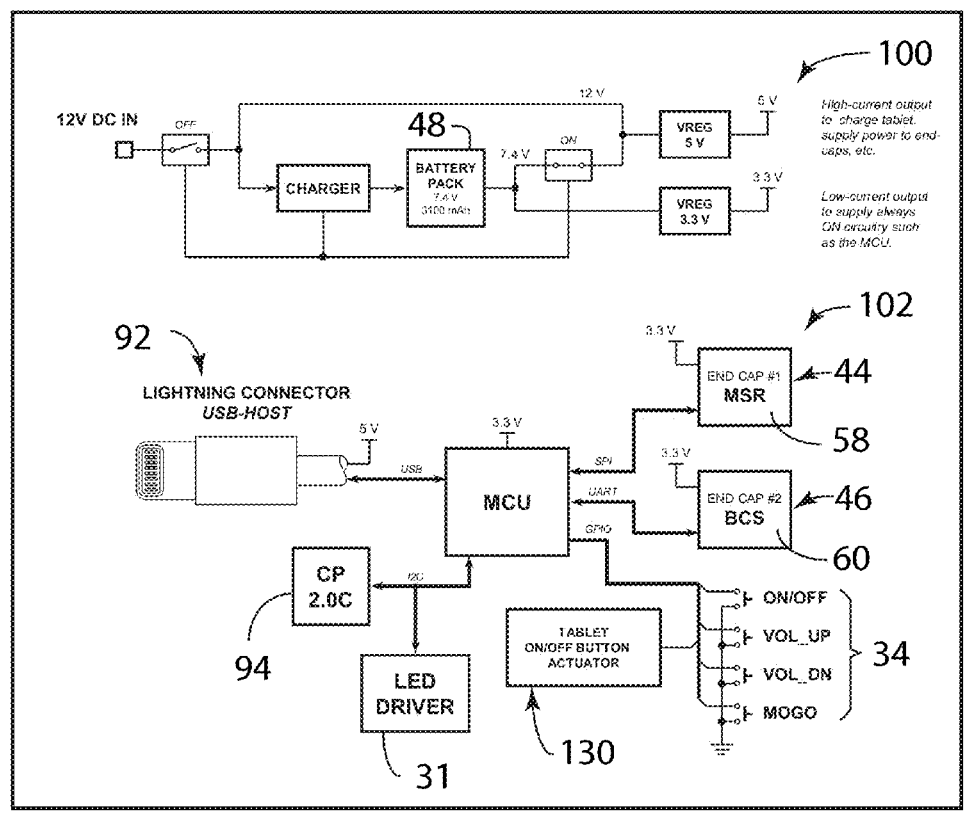
FIG. 27 shows circuits associated with an alternative operating system architecture in accordance with an embodiment of this disclosure.

FIGS. 25-27 illustrate alternate examples of a system architecture associated with the modular assembly 102, in accordance with an embodiment. FIG. 25 shows a schematic diagram of an open USB-based architecture of software and firmware components associated with the tablet computer 100 and the modular assembly 102, in accordance with an embodiment. The tablet computer 100 includes its operating system (OS) 70 and core application programming interface 72 (or API) which can communicate via main circuit board 50. The core application programming interface (API) 72 specifies how the software components should interact with each other. The core API 72 includes, for example, a command and/or control module 74 (i.e., a controller), a status module 76, a charging and power management module 78, a manufacturer data module 80, and a device field upload module 82. The tablet computer 100 may have the ability to add and/or customize software application(s) tailored to specific use cases, shown here as a demo application 68. Also shown are a first end cap EC1 API 84 and second end cap EC2 API 86. Each of the components is configured to communicate via sending and receiving signals and commands to other components. The demo application 68, operating system 70, core API 72, and EC1 API 84 and EC2 API 86 are all in communication with each other. The demo application 68 is in charge of communication with the firmware/MCU of the modular assembly 102.

As shown, the tablet computer 100 and the modular assembly 102 communicate via USB classes or protocols like HID—Human Interface Device and VCP—Virtual Com Port.

The modular assembly 102 has firmware including a microcontroller (MCU), the first end cap 44 with its own circuit board 58 and the second end cap 46 with its circuit board 60. The MCU, first end cap, and second end cap communicate (e.g., via sending signals and/or commands using the circuit board 58 and 60) with the tablet computer via USB connection 88.

The architecture shown in FIG. 25 allows for adjustment or altering of the software on the tablet side, if needed. For example, the demo application 68 can be uploaded or downloaded and updated as necessary. MCU of the modular assembly 102 allows for downloading of new software as well, and, per its USB connection 88, software associated with one or more of the end caps 44 and/or 46 can be transferred into the hub and MCU of the modular assembly 102.

Not shown in schematic diagram of FIG. 25 are a series of buttons associated with the modular assembly 102. However, it should be understood that when such a button is pressed, the MCU detects and sends, as HID information, commands to the tablet OS 70. The MCU may send off status reports if another action is received or happens, which, in such a case, may be communicated via VCP into the core API 72.

FIG. 26 shows exemplary circuits associated with the "open" USB-based architecture of FIG. 25, in accordance with an embodiment of this disclosure. As shown, the circuit associated with the tablet computer 100 includes a 12V DC input to a switch, a charger, battery pack such as battery 48, another switch, and voltage regulators. One voltage regulator may output a voltage (e.g., 5 volts) with high-current output to charge tablet supply power to end-caps, etc. The other voltage regulator may output a voltage (e.g., 3.3 volts) with low-current output to supply always ON circuitry, such as the MCU.

Also shown in FIG. 26 is circuitry associated with the modular assembly 102. The circuitry shows a 30-pin connector like connector 56 that is connected for communication with the tablet circuitry via a USB FS Hub. Alternatively, a wireless connection may be used (as previously noted). The USB FS Hub is in communication with the first end cap 44 via its circuit board 58 (shown here as an MSR), the second end cap 46 via its circuit board 60 (shown here as a bar code scanner (BCS)), the MCU, and optionally other device(s) or end caps, as represented by TBD. The MCU controls any LEDs 29 of the modular assembly 102 via I2C communication. The buttons on the modular assembly 102 (e.g., on/off, volume, programmable button(s)) communicate with the MCU via GPIO. A tablet on/off button actuator 130 (or actuation system) is electromechanically in communication with the MCU as well (e.g., as previously described). Essentially, the MCU of the modular assembly 102 talks to the OS 70 and core API 72 of the tablet computer via the USB hub.

FIG. 27 shows circuits associated with an alternative operating system architecture, e.g., such as iOS-specific architecture, in accordance with an embodiment of this disclosure. The circuit associated with the tablet computer 100 includes a 12V DC input to a switch, a charger, battery pack such as battery 48, another switch, and voltage regulators. One voltage regulator may output a voltage (e.g., 5 volts) with high-current output to charge tablet supply power to end-caps, etc. The other voltage regulator may output a voltage (e.g., 3.3 volts) with low-current output to supply always ON circuitry, such as the MCU.

Since some OS devices only have a single USB line, and not a hub or multiple attachments or connections as found in other USB-based architectures, a connection device such as a lightning connector 92 in the form of a USB-host can be provided in the modular assembly 102 to act as a USB bridge to the MCU. Alternatively, a wireless connector may be used. Such OS devices may further include an authentication processor 94 that is connected to the MCU to authenticate and confirm the accessory—which, in this case, is the modular assembly 102—is compatible and authentic. The MCU is in communication with the first end cap 44 via its circuit board 58 (shown here as an MSR), the second end cap 46 via its circuit board 60 (shown here as a bar code scanner (BCS)), and optionally other device(s) (not shown). The MCU may control the LEDs of the modular assembly 102 via I2C communication with an LED driver 31. The buttons on the modular assembly 102 (e.g., on/off, volume, programmable button(s)) communicate with the MCU via GPIO. A tablet on/off button actuator 130 (or actuation system) is electromechanically in communication with the MCU as well (e.g., as previously described). Essentially, the MCU of the modular assembly 102 talks to the OS 70 and core API 72 of the tablet computer via the USB-host in the form of connector 92.

FIG. 28 shows a flow chart illustrating a method 110 for automatically monitoring the battery status and charging and controlling the state of charge of the battery of a tablet computer enclosed within a modular assembly 102 as disclosed herein. The method 110 can be implemented, e.g., using the software and firmware of the system, e.g., via the status module 76 (e.g., measures level or percentage of charge) and charging and power management module 78 and/or command module 74, as shown in FIG. 25. The method 110 as shown in FIG. 28 includes monitoring and controlling the state of charge of the batteries in the modular assembly 102 as well, in order to prolong the life or use of the tablet battery.

Generally, the method 110 includes: automatically monitoring a state of charge of the at least one case battery; automatically monitoring a state of charge of the tablet battery; and automatically charging the tablet battery using the at least one case battery. In an embodiment, monitoring a state of charge of the tablet battery comprises determining if the state of charge of the tablet battery is less than a predetermined amount of its total capacity, and wherein the automatically charging the tablet battery using the at least one case battery is performed after determining that the state of charge of the tablet battery is less than the predetermined amount.

The method 110 allows for optimization of battery life with concurrent use of charging the tablet computer 100 while powering the peripheral end caps 44 and 46. No manual intervention is required to charge the tablet battery. Thus, method 110 may also be referred to as a charging algorithm for the tablet computer 100. The method 110 may be implemented by the modules 74-82 of the core API of the tablet computer 100, for example. In an embodiment, the method 110 is provided as an application for download or implementation on the tablet computer. Accordingly, when method 110 is implemented as an application, it can be updated as needed.

As shown in FIG. 28, the method 110 may begin or start at 112 and the tablet battery state of charge is monitored, as noted at 114. At 116 it is determined if the case battery (or batteries) has a state of charge, that is greater than 40% of its total capacity. In an embodiment, if the state of charge VCASE of the case battery is not greater than 40% of its total capacity, i.e., NO—the state of charge of the case battery is lower than (or equal to) 40%, then there is not enough or sufficient excess capacity to charge the tablet battery. Thus, there is no need to check the state of charge of the tablet computer 100, since it cannot be charged by the batteries of the modular assembly 102. Thus, the method may be restarted.

In an embodiment, an alert may be optionally provided as shown at 120 to alert a user that the state of charge is low and that charging (e.g., via a plug-in connector (to an electrical outlet) or inductive charging) is, or will be, required for the batteries 48 and/or 54 of the modular assembly 102 and/or tablet computer 100. In an embodiment, the alert at 120 is provided by turning on, or changing color of the LEDs on the modular assembly 102. The number of LEDs that are lit may also be adjusted, or, alternatively, the LEDs may be configured to flash. Of course other alerts, such as an alarm (visual or audible) on the tablet computer 100 and/or on the modular assembly 102 may also be used. The optional alert may be provided in any number of forms and is not intended to be limiting.

In an embodiment, the battery(ies) 48 and/or 54 of the modular assembly 102 can be charged alone or together with the battery of the tablet computer 100 enclosed therein. For example, in an embodiment, the tablet battery can be charged via inductive charge, e.g., via a mat configured to inductively charge a tablet computer placed on the mat. In an embodiment, the battery(ies) 48 and/or 54 associated with the modular assembly 102 may be inductively charged. In an embodiment, the modular assembly 102 can provide access to the tablet computer 100 to allow a plug-in connector to be inserted for charging. In an embodiment, a plug-in connector can be inserted into a port in the modular assembly 102 to simultaneously charge the battery(ies) 48 and/or 54 and the tablet battery, or just the battery(ies) 48 and/or 54. The devices and methods used to charge the batteries 48 and/or 54 and tablet battery should not be limited.

Referring back to FIG. 28, at 116, if the state of charge VCASE of the case battery is greater than 40% of its total capacity, i.e., YES, it is then determined at 118 if the state of charge of the tablet battery, represented as VTABLET in FIG. 23, is less than 35% of its total capacity. If it is not, i.e., NO, then the method 110 may restart. An optional alert may be provided, as shown at 120.

If, however, it is determined that YES, the state of charge VTABLET of the tablet battery is less than 35% of its total capacity, then the method 110 continues from 118 and as shown at 122 it is determined if the state of charge VTABLET is less than 20% of its total capacity. If NO at 122, then the method continues to monitor the charge of the tablet, as shown at 126, and continues to determine if the state of charge VTABLET of the tablet computer is below 35% and 20%.

If the state of charge VTABLET of the tablet battery is less than 20%, i.e., YES at 122, then the tablet battery charging is started at 124, and then the method continues to monitor the charge of the tablet, as shown at 126.

If the state of charge VTABLET of the tablet battery is greater than 20% (but less than 35%), continue charging the battery. That is, any detection that the state of charge of the tablet battery is greater than 20%, it will bypass but still continue to charge the tablet battery until it is at 35% of its total capacity. Once the state of charge VTABLET of the tablet battery is greater than 35%, as determined at 118, i.e., NO, then the method 110 re-starts at 112.

If or once the state of charge VTABLET of the tablet computer is determined to be less than 20% of its total capacity at 122, i.e., YES, then charging of the tablet battery is started or initiated at 124. In particular, the battery (or batteries) of the modular assembly 102 are used to charge the battery of the tablet computer 100 as well as provide power to the end caps and case (and their functions). The battery of the tablet can be charged, for example, until the state of charge VTABLET of the tablet battery is determined to be 35% of its total capacity. Then, the charging of the battery can be stopped.

A battery charge that is greater than (or equal to) 35% of its total capacity does not require the battery to be charged. Thus, the battery does not need to be charged, or its charging originally initiated at 124 may be stopped, at least until the state of charge VTABLET is again determined to be lower than 20% of its total capacity (or until the state of charge VCASE falls below 40% of its total capacity).

Of course, the percentages of total battery capacity noted in the method 110 above and as shown in FIG. 28 are exemplary and are not intended to be limiting. The percentages can be altered or adjusted based on the specific requirements of the intended application.

Accordingly, the method 110 as shown in FIG. 28 illustrates how the charging and power management of the modular assembly 102 may reside in the software and how it is managed automatically), without human intervention or human interaction to control the charging of the tablet battery (e.g., unlike Mophie® and other mobile recharging platforms, which require a push button to start charging of a tablet battery. The modular assembly 102 continuously and/or constantly receives information on the state of the tablet battery and the batteries within the modular case assembly and end caps and determines if/what should be charged (e.g., microprocessor).

In accordance with an embodiment, the software and/or firmware can be programmed or manipulated based on the type of end cap 44 and/or 46 provided on or with the modular assembly 102. Devices that are configured to communicate using HID protocols may limit communication between the OS 70 and/or core API 72 of the tablet computer 100 and the functional device of the end cap 44 and/or 46. As an example, a barcode scanner (BCS) in an end cap, such as shown in FIG. 16, when used in "HID Keyboard" mode with the USB descriptor subclass set to "BOOT" (the "de facto" default) under an Android system, results in allowing only one-way communication from the BCS to the tablet. An example of such communication is shown in FIG. 29. The BCS communicates via the USB to the OS of the tablet. However, communication from the tablet computer 100 to the BCS is limited or not allowed. That is, no control of the BCS via the software/firmware is possible.

In order to have the end caps 44 and 46 and tablet computer 100 in two-way communication with each other, the communication protocol may be adjusted for one or more of the end caps 44 and/or 46, as needed. An embodiment for implementing a "pseudo" HID keyboard for the BCS end cap 44 in an Android system is shown in FIG. 30. The MCU is connected as a HID device without BOOT. The BCS is connected via VCP to core API 72.

The BCS sends data via VCP to the tablet computer 100, which in turn, data is sent to the MCU via VCP. The MCU then converts the data to HID keyboard commands and send packets back to the tablet computer (where Android processes the packets). Control of the BCS, then, is implemented through VCP. Accordingly, the BCS end cap 44 looks like a keyboard to the tablet's OS/Android reader, thus allowing two-way communication between the BCS and the tablet computer 100.

Utilizing the communication protocols in the manner shown in FIG. 30 permits consistent, reliable communication to BCS peripheral end cap 44 (or any another end cap) while minimizing programming and customization requirements for the targeted software applications. Such alterations may be implemented and performed through coding and programming. There is no added software required to read and/or send and receive data between the end caps and tablet computer.

In addition to monitoring and reporting the battery status of both the modular assembly and tablet without the need for user interaction or implementation, the software and/or firmware may be configured to also perform diagnostics on subsystems within the modular assembly 102 and may report such determinations or finding to an end user.

Also, in an embodiment, a software development kit may be provided for use in conjunction with the modular assembly 102 to allow for the capability of embedding the functionality (or functionalities) of end caps 44 and/or 46 into a selected software application to control the USB architecture.

Further, third party applications may be configured and integrated for use with the modular assembly 102. Mobile payment/processing applications, CRM applications, Mapping/intelligent routing applications, barcode scanning applications, device geo-tracking applications, hosted content management and delivery applications, general image capture/upload applications, and other applications as currently known or developed later, can be designed, tested and deployed by third party application developer community and implemented in the modular assembly 102.

In accordance with an embodiment, part of the enclosure of the modular assembly 102 can be disassembled and still function. In an embodiment, in an event that one or both end caps are removed, the design of the tablet carrier 10 and exterior housing 12 still permits operation of the tablet computer 100. Thus, the design may include a singular functional end cap, or none at all. In another embodiment, in the event that one or both end caps are removed, one or more programmable buttons (e.g., as described above) are provided on the tablet carrier 10 and/or exterior housing 12 and are configured for use to automatically actuate or implement a tablet associated function (e.g., open an application or a program).

Accordingly, this disclosure provides a modular assembly design that supports and extends customer media tablet computers and similar electronic devices by providing a range of customizable solutions that are durable and provide protection to the tablet computer. The modular assembly can be flexibly configured and/or customized to provide a tailored solution with specific functions associated with its peripheral components (in the form of interchangeable end cap portions) that enclose a tablet, in addition to providing decorative and protective features. It can further include customized software loading that can be implemented or accessed via programmable button(s). The assembly accommodates customer-interactive applications, consolidates features for specific uses, and provides a solution for complementary functionality to a range of different types of tablets (e.g., can be assembled with end cap(s) for a targeted use). The disclosed assembly is not limited by volume leverage, and provides flexibility to cover a variety of enterprise use cases.

The modular assembly can be installed on tablet computer(s) and used in any number of markets, including, but not limited to, hospitality, retail, financial services, medical, and transport industries. It can be built, made or manufactured, and mounted or assembled for connection with any number of existing tablet computers or customized tablet computers. Hence, from a manufacturing standpoint, the designer can use the same external housing 12 and the same end caps with different interposers/carriers 10 and different types of tablet computers 100. This reduces the amount of custom tooling required, and allows the usage of a same or common external housing and types of end caps to be allocated across systems or assemblies accommodating tablet computers 100 of differing types.

That is, because the interposer/carrier 10 is the structure that mechanically interfaces with the tablet computer 100, in terms of fitting closely for proper securement and also possibly in terms of providing access to the button(s) and/or port(s) on the tablet computer 100, it can be varied to accommodate different tablet computers 100 while the external housing 12 can remain the same. Thus, a high degree of flexibility and modularity may be achieved because a common external housing 12 can be used with different interposers/tablet carriers 10 to use on different types of tablet computers 100. Thus flexibility and modularity is further increased because the external housing 12 has the interface(s) for receiving end caps of different types.

The modular assembly 102 is a fully mobile device. It provides a mobile, consistent, OS-agnostic solution for deploying consumer media tablets and electronic devices with a variety of peripheral end caps which may be targeted to specific business usage scenarios. The modular assembly 102 may have ubiquitous data access, i.e., used indoors or outside without access to power or it may have geo-restricted data access, i.e., restricted to a network (e.g., LAN or via GPS). As previously noted, it further can be used in a stationary or docked configuration, with or without perpetual access to power and/or other connectable devices (e.g., to a screen).

Also, the modular assembly 102 as disclosed herein may be designed to provide several features for use with tablet computers (and/or phablets and/or other types of electronic devices) which may include, but are not limited to: can double battery capacity of media tablet, protects the media tablet computer and corresponding end cap peripherals, can be water resistant, prevent egress of water and/or dust into the tablet carrier and/or modular assembly, to provide thermal shock absorption and withstand vibrations, withstand temperature differences and extremes, provide a non-slip grip or surface, allow for holding with one or both hands with minimal fatigue due to its curved design, and accessibility of key functions are not blocked by ports or cables. The modular assembly 102 protects the case battery(ies) 48 and/or 54 so that there is power for the associated functions, LEDs, buttons, etc. in the end caps 44 and/or 46, while still allowing for charging of the tablet battery. The modular assembly 102 can be provided in one or multiple colors, exterior finishes, and/or with or without branding options.

In an embodiment, parts of the tablet carrier and the exterior housing can be integrally formed or joined together. The elements, features, and connection and separation of such elements, as shown in the Figures, are not limiting. In an embodiment, the exterior housing can be formed with internal surfaces that correspond to a selected type of tablet, while its outer or outside surfaces have a common or universal design.

The disclosed modular assembly further increases battery life and is low cost. It can include both electronic and direct actuation of buttons on tablet computers. The accessibility of key functions is not blocked by ports or cables in this modular assembly.

Moreover, the materials and specifications of the parts and modular assembly described herein are not intended to be limited. The one or more batteries (e.g., battery 48 and/or 54) can be a swappable 2000 mAh or 4000 Ah battery that can be inductively charged by the power booster, for example.

Although not described in detail herein, it should be understood that the modular assembly 102 can include other features, some of which are shown in the example chart in FIG. 19. These include, but are not limited to, an adjustable handstrap, an additional battery, a pen holder or garage, audio outlets or output, ports, controls or buttons, indicators (e.g., LEDs), optional keypad, and optional mounting bracket. The functional devices used with the one or more end caps 44 and/or 46 can vary, as previously noted.

In an embodiment, one or more seals (e.g., gland seal, O-rings, membrane) are provided in tablet carrier 10 and/or external housing 12 for aiding in limiting ingress of moisture, water, or dust of/from an environment, for example, from entering the modular assembly 102, interfering with parts contained therein, and limiting damage to parts (e.g., preventing damage to the tablet itself and the functional devices within in the end cap(s)). For example, the assembly can be formed using plastic(s) that are sealed (via one or more seals) to meet Mil. Std. 810g and IP 54+. Also, for example, a material can be applied to vary the feel of the exterior surface of the exterior housing 12, e.g., non-slip or rubberized feel to metallic finish, and alternating colors can used on the exterior housing (e.g., primary and/or accent colors). Logos, symbols, and/or other branding can also be applied on the exterior housing 12. A hand strap can be applied to the bottom surface of the bottom 42 of external housing 12 (e.g., back of the modular assembly 102), for example. The hand strap can include an adjustable strap that can be temporarily secured (by a device such as hook and loop material or a snap) and oriented to comfortably allow usage of the overall solution in both landscape and portrait orientations. An optionally lockable fixed mount bracket that fixes power input or docket for battery charging can also be provided. The optional lockable fixed mount bracket can provide the option of locking the tablet to the fixture, ensuring the power source maintains connection, and provide multiple interface options to stationary stands or fixtures.

While the principles of the disclosure have been made clear in the illustrative embodiments set forth above, it will be apparent to those skilled in the art that various modifications may be made to the structure, arrangement, proportion, elements, materials, and components used in the practice of the disclosure. For example, any reference to "first" and "second" end caps should not be limiting, including the examples of types and/or applications of first and second end caps. One of ordinary skill in the art understands that the use of first and second is not intended to limit the type, application, location, and/or use of both end caps at the same time on the same tablet carrier. Further, two end caps need not be used at the same time in the modular case assembly. Moreover, as previously noted, each end cap need not provide a function or have functional device therein, and may merely be used as a part, case, or holder (for other devices) in the modular assembly. For example, in one embodiment, an end cap may be used as a storage device. The end cap may include a hollow portion therein to hold a cord, connector, earphones or earbuds, accessories, or other devices that may be used with the enclosed tablet computer and/or modular assembly.

Also, the articles "a" and "an" are used herein to refer to one or to more than one (i.e., to at least one) of the grammatical object of the article. Additionally, any reference to more than one item in the description (e.g., end caps, devices, batteries, etc.) is not intended to be limited to the use of only more than one of such articles, but for descriptive and/or explanatory purposes only. It should be understood that singular articles may be used without departing from the scope of this disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A modular case assembly for a selected range of tablet computers, the modular assembly comprising:
   a tablet carrier encasing a selected tablet computer selected from the range of tablet computers, the selected tablet computer having a length, a width, one or more ports, and an external button configuration;
   an exterior housing enclosing the tablet carrier, the exterior housing comprising at least one battery and a controller for communication with the selected tablet computer;
   an end cap attached to the exterior housing and including a functional device in communication with the controller by a connector;
   wherein the tablet carrier has internal surfaces for retaining the selected tablet computer while still providing access to the one or more ports and the external button configuration of the selected tablet computer,
   wherein the at least one battery and the controller contained by the exterior housing are operatively connected to one or more ports of the tablet computer so as to allow communication of power and data between the controller, the tablet computer, and the functional device of the end cap, and
   wherein the tablet carrier and/or exterior housing comprises at least one programmable button for communicating with the tablet computer to implement a specified function via at least the controller when connected for communication with the tablet computer.

2. The assembly according to claim 1, wherein the tablet carrier comprises a top portion and a bottom portion, the top portion and the bottom portion of the tablet carrier having the internal surfaces for retaining the selected tablet computer.

3. The assembly according to claim 1, further comprising one or more actuators for actuating one or more buttons on the tablet computer, wherein the at least one programmable button is configured to cause at least one of the one or more actuators to actuate its corresponding button.

4. The assembly according to claim 3, further comprising one or more mechanical devices associated with the one or more actuators, wherein each of the one or more actuators is configured to activate movement of the one or more mechanical devices to thereby actuate a corresponding button on the tablet computer.

5. The assembly according to claim 3, wherein the at least one programmable button is provided on a first axis for actuational movement along the first axis, wherein the corresponding button configured for actuation by the at least one of the one or more actuators is provided on a second axis for actuational movement along the second axis, and wherein the first axis and second axis are different from each other.

6. The assembly according to claim 5, wherein the programmable button is provided on a plane that is parallel to a plane of the corresponding button.

7. The assembly according to claim 5, wherein the programmable button is provided on a plane that is perpendicular to a plane of the corresponding button.

8. The assembly according to claim 3, wherein the one or more actuators is a shape memory material.

9. The assembly according to claim 3, wherein the one or more actuators is a solenoid.

10. A modular case assembly for a selected range of tablet computers, the modular assembly comprising:
   a tablet carrier encasing a selected tablet computer selected from the range of tablet computers, the selected tablet computer having a length, a width, one or more ports, and an external button configuration;
   an exterior housing enclosing the tablet carrier, the exterior housing comprising at least one battery and a controller for communication with the selected tablet computer;
   an end cap attached to the exterior housing and including a functional device in communication with the controller by a connector;
   wherein the tablet carrier has internal surfaces for retaining the selected tablet computer while still providing access to the one or more ports and the external button configuration of the selected tablet computer, wherein the at least one battery and the controller contained by the exterior housing are operatively connected to one or more ports of the tablet computer so as to allow communication of power and data between the controller, the tablet computer, and the functional device of the end cap, and wherein the end cap is configured to be interchangeable with one or more replacement end caps comprising different functional devices, and wherein the one or more replacement end caps have a connector for connecting to the controller, and wherein the one or more replacement end caps are configured to be installed on the exterior housing.

11. The assembly according to claim 1, further comprising an additional, second end cap attached to the exterior housing and including a functional device in communication with the controller by a connector, and wherein the at least one battery and the controller are operatively connected so as to further allow communication of power and with the functional device of the additional, second end cap.

12. The assembly according to claim 1, wherein the functional device of the end cap is selected from the group consisting of: a magnetic strip reader and/or writer, a smart card reader, a secure chip and pin access device, an RFID reader, a scanner, a battery, a power source, a camera, an image capture device, and a geo-tracking device.

13. A method for installing a plurality of modular assemblies to a plurality of tablet computers having varying lengths and/or widths and one or more ports and button configurations, said method comprising:

providing a plurality of first tablet carriers that are each configured to encase a first type of tablet computer when the carriers are installed on their corresponding tablet computers;

providing a plurality of second tablet carriers that are each configured to encase a second type of tablet computer when the carriers are installed on their corresponding tablet computers, the second type of tablet computer being different than the first type of tablet computer;

wherein the plurality of the first and the second tablet carriers each have internal surfaces for retaining the respective first and second types of tablet computers while still providing access to the one or more ports and buttons of the first and second types of tablet computers when the first and second tablet carriers are installed therearound;

providing a plurality of common exterior housings that are each configured to enclose the first and second tablet carriers once the first and second tablet carriers are installed on their corresponding tablet computers, each exterior housing comprising at least one battery and a controller for communication with its corresponding tablet computer;

providing a plurality of end caps each configured for attachment to the plurality of common exterior housings and including a functional device for communication with the controller by a connector; and, wherein the method further includes:

installing the first tablet carriers on the first type of tablet computers, installing the second tablet carriers on the second type of tablet computers, and installing the common exterior housings to enclose the first and second tablet carriers therein with the respective first and second types of tablet computers installed;

installing the end caps on the common exterior housings and establishing communication between the controllers and the functional devices;

wherein the installing of each of the common exterior housings includes operatively connecting the at least one battery and the controller to one or more ports of each of the corresponding tablet computers so as to allow communication of power and data between the controllers, the corresponding tablet computers, and the functional devices of the end caps.

14. The method according to claim 13, wherein the tablet carrier comprises a top portion and a bottom portion, the top portion and the bottom portion of the tablet carrier having the internal surfaces for retaining the selected tablet computer.

15. The method according to claim 13, wherein the installing further comprises connecting the connector of each of the selected end caps to the controllers so as to allow communication between each of the selected end caps and the controllers.

16. The method according to claim 13, wherein the first and second tablet carriers and/or common exterior housings comprise at least one programmable button for communicating with its corresponding tablet computers to implement a specified function via at least the controller when connected for communication with the corresponding tablet computers.

17. The method according to claim 16, wherein each the first and second tablet carriers and/or each of the common exterior housings further comprise one or more actuators for actuating one or more buttons on the respective tablet computers, and wherein the at least one programmable button is configured to cause at least one of the one or more actuators to actuate its corresponding button.

18. The method according to claim 17, wherein each the first and second tablet carriers and/or each of the common exterior housings further comprise one or more mechanical devices associated with the one or more actuators, wherein the one or more actuators is configured to activate movement of the one or more mechanical device to thereby actuate a corresponding button on the tablet computer, and wherein the installing of the first and second tablet carriers or the installing of the common exterior housings further comprises aligning the one or more mechanical devices relative to the tablet computer for actuating the corresponding button on the tablet computer.

19. The method according to claim 13, wherein the selected end caps are configured to be interchangeable with one or more replacement end caps comprising different functional devices, and wherein the method further comprises:

removing the selected end caps from the common exterior housings;

selecting replacement end caps; and installing the replacement end caps on the common exterior housings with respect to the installed first and second tablet carriers, wherein the installing of each of the replacement end caps allows communication of power and data between the controllers, the corresponding tablet computers, and the replacement end caps.

20. The method according to claim 19, wherein the removing of the selected end caps further comprises removing the selected end caps from the common exterior housings by disconnecting a connector of the selected end caps from the controller, and wherein the installing of each of the replacement end caps includes connecting the connector of the replacement end caps to the controller so as to allow communication between the replacement end caps and the controller.

21. An encased tablet computer system comprising:
a tablet computer,
a tablet carrier encasing the tablet computer, the tablet computer having a length, a width, one or more ports, and an external button configuration;
an exterior housing enclosing the tablet carrier, the exterior housing comprising at least one battery and a controller for communication with the tablet computer;
an end cap attached to the exterior housing and including a functional device in communication with the controller by a connector;
wherein the tablet carrier has internal surfaces for retaining the tablet computer while still providing access to the one or more ports and the external button configuration of the tablet computer,
wherein the at least one battery and the controller contained by the exterior housing are operatively connected to one or more ports of the tablet computer so as to allow communication of power and data between the controller, the tablet computer, and the functional device of the end cap, and
wherein the tablet carrier and/or exterior housing comprises at least one programmable button for communicating with the tablet computer to implement a specified function via at least the controller when connected for communication with the tablet computer.

22. The system according to claim 21, wherein the tablet carrier comprises a top portion and a bottom portion, the top portion and the bottom portion of the tablet carrier having the internal surfaces for retaining the tablet computer.

23. The system according to claim 21, further comprising one or more actuators for actuating one or more buttons on the tablet computer, wherein the at least one programmable button is configured to cause at least one of the one or more actuators to actuate its corresponding button.

24. The system according to claim 23, further comprising one or more mechanical devices associated with the one or more actuators, wherein the one or more actuators is configured to activate movement of the one or more mechanical device to thereby actuate a corresponding button on the tablet computer.

25. The system according to claim 23, wherein the at least one programmable button is provided on a first axis for actuational movement along the first axis, wherein the corresponding button configured for actuation by the at least one of the one or more actuators is provided on a second axis for actuational movement along the second axis, and wherein the first axis and second axis are different from each other.

26. The system according to claim 25, wherein the programmable button is provided on a plane that is parallel to a plane of the corresponding button.

27. The system according to claim 25, wherein the programmable button is provided on a plane that is perpendicular to a plane of the corresponding button.

28. The system according to claim 23, wherein the one or more actuators is a shape memory material.

29. The system according to claim 23, wherein the one or more actuators is a solenoid.

30. An encased tablet computer system comprising:
a tablet computer,
a tablet carrier encasing the tablet computer, the tablet computer having a length, a width, one or more ports, and an external button configuration;
an exterior housing enclosing the tablet carrier, the exterior housing comprising at least one battery and a controller for communication with the tablet computer;
an end cap attached to the exterior housing and including a functional device in communication with the controller by a connector;
wherein the tablet carrier has internal surfaces for retaining the tablet computer while still providing access to the one or more ports and the external button configuration of the tablet computer,
wherein the at least one battery and the controller contained by the exterior housing are operatively connected to one or more ports of the tablet computer so as to allow communication of power and data between the controller, the tablet computer, and the functional device of the end cap, and
wherein the end cap is configured to be interchangeable with one or more replacement end caps comprising different functional devices, and wherein the one or more replacement end caps have a connector for connecting to the controller, and wherein the one or more replacement end caps are configured to be installed on the exterior housing.

31. The system according to claim 21, further comprising an additional, second end cap attached to the exterior housing and including a functional device in communication with the controller by a connector, and
wherein the at least one battery and the controller are operatively connected so as to further allow communication of power and with the functional device of the additional, second end cap.

32. The system according to claim 21, wherein the functional device of the end cap is selected from the group consisting of: a magnetic strip reader and/or writer, a smart card reader, a secure chip and pin access device, an RFID reader, a scanner, a battery, a power source, a camera, an image capture device, and a geo-tracking device.

33. A method for automatically monitoring and charging a tablet computer enclosed within a modular case assembly, the modular assembly comprising: a tablet carrier encasing the tablet computer, the tablet computer having a length, a width, one or more ports, a tablet battery, and an external button configuration, an exterior housing enclosing the tablet carrier, the exterior housing comprising at least one case battery and a controller for communication with the tablet computer, at least one end cap attached to the exterior housing and including a functional device in communication with the controller by a connector, the tablet carrier having internal surfaces for retaining the tablet computer while still providing access to the one or more ports and the external button configuration of the tablet computer, the at least one case battery and the controller being contained by the exterior housing and operatively connected to one or more ports of the tablet computer so as to allow communication of power and data between the controller, the tablet computer, and the functional device of the at least one end cap; wherein the method comprises:
automatically monitoring a state of charge of the at least one case battery;
automatically monitoring a state of charge of the tablet battery; and
automatically charging the tablet battery using the at least one case battery.

34. The method according to claim 33, wherein the automatically monitoring a state of charge of the tablet battery comprises determining if the state of charge of the tablet battery is less than a predetermined amount of its total capacity, and wherein the automatically charging the tablet battery using the at least one case battery is performed after determining that the state of charge of the tablet battery is less than the predetermined amount.

35. The method according to claim 34, wherein the automatically monitoring a state of charge of the tablet battery further comprises determining if the state of charge of the at least one case battery is less than a predetermined amount of its total capacity, and wherein the automatically charging the tablet battery using the at least one case battery is performed after further determining that the state of charge of the at least one case battery is less than the predetermined amount.

36. The assembly according to claim 10, wherein the functional devices of the end caps are selected from the group consisting of: a magnetic strip reader and/or writer, a smart card reader, a secure chip and pin access device, an RFID reader, a scanner, a battery, a power source, a camera, an image capture device, and a geo-tracking device.

37. The system according to claim 30, wherein the functional devices of the end caps are selected from the group consisting of: a magnetic strip reader and/or writer, a smart card reader, a secure chip and pin access device, an RFID reader, a scanner, a battery, a power source, a camera, an image capture device, and a geo-tracking device.

38. The assembly according to claim 1, further comprising one or more LED indicators configured for illumination to indicate a specific action associated with the tablet carrier.

39. The system according to claim 21, further comprising one or more LED indicators configured for illumination to indicate a specific action associated with the tablet carrier.

40. A modular case assembly for a selected range of tablet computers, the modular assembly comprising:
　a tablet carrier encasing a selected tablet computer selected from the range of tablet computers, the selected tablet computer having a length, a width, one or more ports, and an external button configuration;
　an exterior housing enclosing the tablet carrier, the exterior housing comprising at least one battery and a controller for communication with the selected tablet computer;
　a cap attached to the exterior housing and including a functional device in communication with the controller by a connector;
　wherein the tablet carrier has internal surfaces for retaining the selected tablet computer while still providing access to the one or more ports and the external button configuration of the selected tablet computer,
　wherein the at least one battery and the controller contained by the exterior housing are operatively connected to one or more ports of the tablet computer so as to allow communication of power and data between the controller, the tablet computer, and the functional device of the cap, and
　wherein the tablet carrier and/or exterior housing comprises at least one programmable button for communicating with the tablet computer to implement a specified function via at least the controller when connected for communication with the tablet computer.

41. An encased tablet computer system comprising a tablet computer and the modular case assembly of claim 10.

42. A method for installing a plurality of modular assemblies to a plurality of tablet computers having varying lengths and/or widths and one or more ports and button configurations, said method comprising:
　providing a plurality of first tablet carriers that are each configured to encase a first type of tablet computer when the carriers are installed on their corresponding tablet computers;
　providing a plurality of second tablet carriers that are each configured to encase a second type of tablet computer when the carriers are installed on their corresponding tablet computers, the second type of tablet computer being different than the first type of tablet computer;
　wherein the plurality of the first and the second tablet carriers each have internal surfaces for retaining the respective first and second types of tablet computers while still providing access to the one or more ports and buttons of the first and second types of tablet computers when the first and second tablet carriers are installed therearound;
　providing a plurality of common exterior housings that are each configured to enclose the first and second tablet carriers once the first and second tablet carriers are installed on their corresponding tablet computers, each exterior housing comprising at least one battery and a controller for communication with its corresponding tablet computer;
　providing a plurality of caps each configured for attachment to the plurality of common exterior housings and including a functional device for communication with the controller by a connector; and,
　wherein the method further includes:
　installing the first tablet carriers on the first type of tablet computers,
　installing the second tablet carriers on the second type of tablet computers, and
　installing the common exterior housings to enclose the first and second tablet carriers therein with the respective first and second types of tablet computers installed;
　installing the caps on the common exterior housings and establishing communication between the controllers and the functional devices;
　wherein the installing of each of the common exterior housings includes operatively connecting the at least one battery and the controller to one or more ports of each of the corresponding tablet computers so as to allow communication of power and data between the controllers, the corresponding tablet computers, and the functional devices of the caps.

* * * * *

UNITED STATES PATENT AND TRADEMARK OFFICE
CERTIFICATE OF CORRECTION

PATENT NO. : 9,652,002 B2  
APPLICATION NO. : 14/280451  
DATED : May 16, 2017  
INVENTOR(S) : Dennis Hamann et al.

Page 1 of 1

It is certified that error appears in the above-identified patent and that said Letters Patent is hereby corrected as shown below:

In the Claims

Column 26, Line 18 (Claim 15), delete "selected" before -end caps-;
       Line 19 (Claim 15), delete "selected" before -end caps-;
       Line 48 (Claim 19), delete "selected" before -end caps-;
       Line 52 (Claim 19), delete "selected" before -end caps-;
       Line 63 (Claim 20), delete "selected" before -end caps-;
       Line 64 (Claim 20), delete "selected" before -end caps-; and
       Line 65 (Claim 20), delete "selected" before -end caps-.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*